(12) United States Patent
Kageyama et al.

(10) Patent No.: US 10,911,548 B2
(45) Date of Patent: Feb. 2, 2021

(54) INFORMATION PROCESSING APPARATUS AND METHOD, TERMINAL APPARATUS, AND INFORMATION PROCESSING SYSTEM

(75) Inventors: Yuichi Kageyama, Tokyo (JP); Mitsuru Takehara, Tokyo (JP); Norifumi Kikkawa, Tokyo (JP); Yuan Wei, Tokyo (JP)

(73) Assignee: Sony Corporation, Tokyo (JP)

( * ) Notice: Subject to any disclaimer, the term of this patent is extended or adjusted under 35 U.S.C. 154(b) by 539 days.

(21) Appl. No.: 14/006,765

(22) PCT Filed: Mar. 22, 2012

(86) PCT No.: PCT/JP2012/001978
§ 371 (c)(1),
(2), (4) Date: Nov. 14, 2013

(87) PCT Pub. No.: WO2012/132344
PCT Pub. Date: Oct. 4, 2012

(65) Prior Publication Data
US 2014/0067972 A1    Mar. 6, 2014

(30) Foreign Application Priority Data
Mar. 30, 2011    (JP) .................................. 2011-076188

(51) Int. Cl.
*H04L 29/08*    (2006.01)
*H04W 4/02*    (2018.01)
(Continued)

(52) U.S. Cl.
CPC .............. *H04L 67/16* (2013.01); *H04L 51/32* (2013.01); *H04W 4/025* (2013.01); *H04W 4/08* (2013.01)

(58) Field of Classification Search
CPC ........ H04L 67/16; H04L 51/32; H04W 4/025; H04W 4/08; G06Q 50/01; G06Q 30/0205
(Continued)

(56) References Cited

U.S. PATENT DOCUMENTS

| 8,417,768 B2 * | 4/2013 | Suetsugu | G06F 13/385 |
| | | | 709/203 |
| 2004/0133612 A1 * | 7/2004 | Satomi | G06F 17/30902 |

(Continued)

FOREIGN PATENT DOCUMENTS

| CN | 1573763 A | 2/2005 |
| JP | 2001-325199 | 11/2001 |

(Continued)

OTHER PUBLICATIONS

Extended European Search Report dated Sep. 17, 2014 in connection with European Application No. 12763053.1.
(Continued)

*Primary Examiner* — Patrice L Winder
*Assistant Examiner* — Aye M Aung
(74) *Attorney, Agent, or Firm* — Xsensus LLP

(57) ABSTRACT

Methods and apparatus of managing a community site. Upon execution of processor-executable instructions by a processing unit, the processing unit manages the community site in accordance with management data so as to permit access to the community site by a plurality of terminal apparatuses based at least in part on terminal data from each of the plurality of terminal apparatuses. The terminal data indicates at least one of a time or a location associated with the terminal apparatus. The processing unit further stores content uploaded from at least one of the plurality of terminal apparatuses to at least one storage device, the content being accessible via the community site. In response to at least one predetermined condition relating to the usage
(Continued)

of the community site being satisfied, the processing unit sends a signal to delete the content from the at least one storage device.

15 Claims, 14 Drawing Sheets

(51) Int. Cl.
*H04W 4/08* (2009.01)
*H04L 12/58* (2006.01)

(58) Field of Classification Search
USPC .......................................................... 709/206
See application file for complete search history.

(56) References Cited

U.S. PATENT DOCUMENTS

| | | | |
|---|---|---|---|
| 2004/0233621 | A1 | 11/2004 | Maeoka et al. |
| 2005/0096936 | A1* | 5/2005 | Lambers ............ H04N 21/2221 |
| | | | 725/135 |
| 2006/0167751 | A1* | 7/2006 | Maruyama ........... G06Q 20/145 |
| | | | 705/14.14 |
| 2006/0223599 | A1* | 10/2006 | Alfaro ..................... A63F 13/10 |
| | | | 463/1 |
| 2009/0241031 | A1* | 9/2009 | Gamaley et al. ............. 715/736 |
| 2010/0056183 | A1* | 3/2010 | Oh .......................... H04L 67/18 |
| | | | 455/456.3 |
| 2010/0269144 | A1* | 10/2010 | Forsman ............ H04N 7/17336 |
| | | | 725/92 |
| 2011/0035264 | A1* | 2/2011 | Zaloom ................. G06Q 10/10 |
| | | | 705/14.12 |
| 2011/0053559 | A1* | 3/2011 | Klein ...................... G07C 13/00 |
| | | | 455/411 |
| 2011/0231490 | A1* | 9/2011 | Inoue ................ H04L 29/08729 |
| | | | 709/204 |
| 2011/0238821 | A1* | 9/2011 | Matsuo ............... H04L 43/0876 |
| | | | 709/224 |
| 2011/0250957 | A1* | 10/2011 | Suzuki .................... A63F 13/12 |
| | | | 463/30 |
| 2012/0110099 | A1* | 5/2012 | Fujihara .............. H04L 12/1818 |
| | | | 709/206 |
| 2012/0197986 | A1* | 8/2012 | Chen ..................... G06Q 30/00 |
| | | | 709/204 |
| 2012/0213404 | A1* | 8/2012 | Steiner ............. G06F 17/30256 |
| | | | 382/103 |
| 2013/0246534 | A1* | 9/2013 | Chebiyyam .................. 709/206 |

FOREIGN PATENT DOCUMENTS

| | | |
|---|---|---|
| JP | 2005-011318 | 4/2004 |
| JP | 2005-11318 | 1/2005 |
| JP | 2005-196243 | 7/2005 |
| JP | 2005-346299 | 12/2005 |
| JP | 2005-346543 A | 12/2005 |
| JP | 2006-108996 | 4/2006 |
| JP | 2007-207013 | 8/2007 |
| JP | 2008-134707 | 6/2008 |
| JP | 2008-287407 | 11/2008 |
| JP | 2010-218524 | 9/2010 |
| JP | 2010-287059 | 12/2010 |

OTHER PUBLICATIONS

Japanese Office Action for Japanese Patent Application No. 2016-215170, dated Mar. 16, 2018—4pg.
Japanese Office Action dated May 13, 2019, issued in corresponding Japanese Patent Application No. 2018-139957.
Japanese Office Action in JP Application No. 2016-215170, dated Sep. 26, 2017, 4 pages.

* cited by examiner

FIG. 3

| TEMPORARY COMMUNITY ID | SETTING RANGE | CONSTITUENT USER | ATTRIBUTE | LAST UPDATE TIME STAMP | NG CONTENT ITEM |
|---|---|---|---|---|---|
| c_1 | X1Y1 (RADIUS 50m) | IP1, IP2, IP10 | FEAST | 20110303T05:10 | NG.txt |
| c_1 | X2Y2 (RADIUS 10m) | IP3, IP4, IP5 | WEDDING | 20110303T23:10 | aaa.mpg |
| c_2 | X3Y3 (RADIUS 10m) | IP6, IP7, IP8, IP9, IP12 | ALUMNI MEETING | 20110303T07:20 | bbb.mp3 |

FIG. 5

| REGISTRATION ID | USER ID | REGISTRATION TIME | VALID PERIOD | CLASSIFICATION | OPEN FLAG |
|---|---|---|---|---|---|
| 1 | IP1 | 20110209T10:00 | 20110210T10:00 | BLOG | OK |
| 2 | IP2 | 20110209T09:00 | 20110210T09:00 | MUSIC CONTENT | OK |
| 3 | IP10 | 20110214T10:00 | 20110215T10:00 | MOVING IMAGE CONTENT | OK |

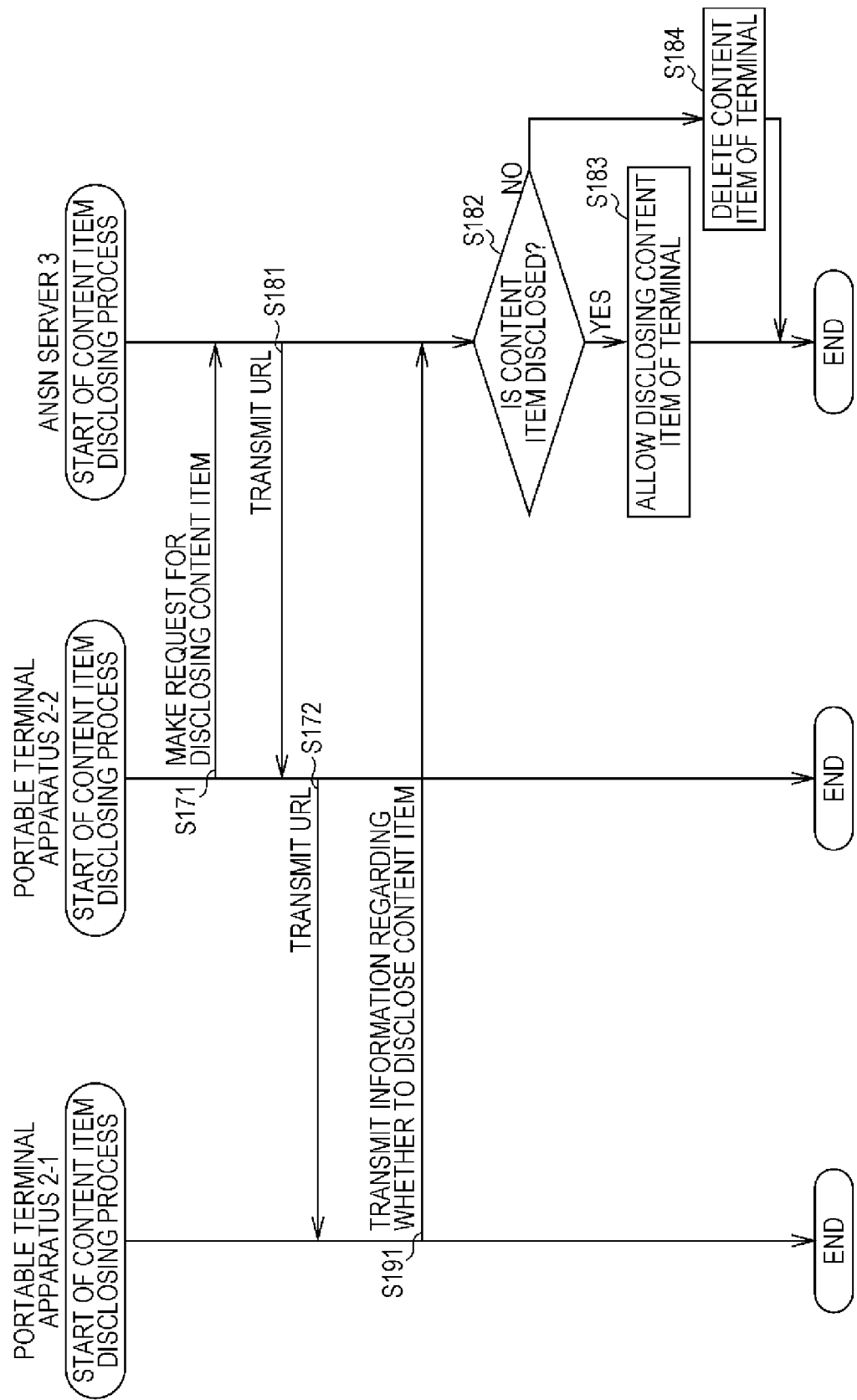

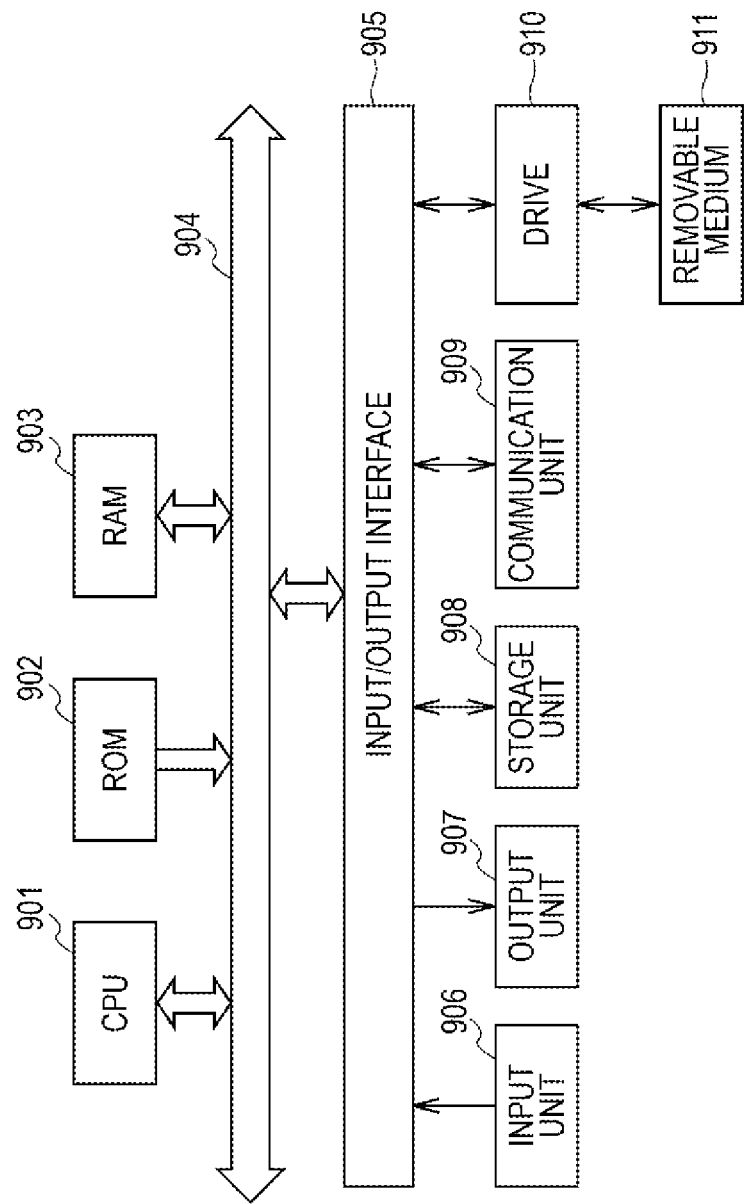

INFORMATION PROCESSING APPARATUS AND METHOD, TERMINAL APPARATUS, AND INFORMATION PROCESSING SYSTEM

TECHNICAL FIELD

The present invention relates to an information processing apparatus and method, a terminal apparatus, and an information processing system, and more particularly, to an information processing apparatus and method, a terminal apparatus, and an information processing system in which a community site can be used with more peace of mind.

BACKGROUND ART

In recent years, various mobile apparatuses such as iPhones (registered trademark) have been connected to the Internet using a communication function such as Wi-Fi, 3G, or Bluetooth (registered trademark).

With these mobile apparatuses, there has been suggested an SNS (Social Network Service) which provides a community site which only users of the mobile apparatuses sharing the same space and time can access by acquiring position information and time information through the function of GPS (Global Positioning System), Wi-Fi, or the like (for example, see Patent Literature 1).

The SNS provides not only a human association on a network via the Internet but also a service in which the human association is realized by ad-hoc mobile apparatuses executing proximity wireless communication and which reflects real world human association, which is referred to as ASNS (Ad-hoc SNS) below. Further, the community site provided by the ASNS is not limited to the community site formed based on the position information or the time information of the mobile apparatuses. The community site can also be formed based on objects (common or similar objects), such as predetermined images or text data in addition to the position information or the time information, which are presented from the mobile apparatuses and are common or similar to each other. For example, the community site may be formed by the mobile apparatuses presenting the common or similar objects, such as the photos or passwords of specific people, in which the position information is nearly identical to each other, within a given time. Further, for example, the community site may be formed by the mobile apparatuses of which the position information is nearly identical to each other. Alternatively, the community site may be formed by the mobile apparatuses presenting the common or similar object within a given time.

CITATION LIST

Patent Literature

PTL 1: Japanese Unexamined Patent Application Publication No. 2010-218524

SUMMARY OF INVENTION

Technical Problem

However, as in a general SNS realized on the Internet, a manager managing the community site is also necessary in the above-described ASNS.

As described above, the real world human association is reflected on the community site made in the ASNS. Therefore, when a meeting is dismissed in the real world, there is a concern that the manager may not manage the community site and thus the community site may be left unmanaged.

Further, even when there is no manager who manages the community site, the number of members accessing the community site is small after the meeting is dismissed in the real word. Therefore, the community site may be left unmanaged.

Furthermore, when the community site is left unmanaged, there is a concern that a third person may secretly look at information of the community site using any method, and thus the information may be revealed. For this reason, the users may not use the community site in relief.

The present technique is devised in the above-mentioned circumstance and an object of the present technique is to use a community site with more peace of mind.

Solution to Problem

One exemplary embodiment described herein is directed to an apparatus for managing a community site. The apparatus comprises a communication unit, at least one memory to store processor-executable instructions, and a processing unit communicatively coupled to the communication unit and the at least one memory. Upon execution of the processor-executable instructions by the processing unit, the processing unit manages the community site in accordance with management data so as to permit access to the community site by a plurality of terminal apparatuses based at least in part on terminal data from each of the plurality of terminal apparatuses. The terminal data indicates at least one of a time or a location associated with the terminal apparatus. The processing unit further stores content uploaded from at least one of the plurality of terminal apparatuses to at least one storage device, the content being accessible via the community site. In response to at least one predetermined condition relating to the usage of the community site being satisfied, the processing unit sends a signal to delete the content from the at least one storage device.

Another exemplary embodiment described herein is directed to a method of managing a community site. The method comprises managing the community site in accordance with management data so as to permit access to the community site by a plurality of terminal apparatuses based at least in part on terminal data from each of the plurality of terminal apparatuses. The terminal data indicates at least one of a time or a location associated with the portable terminal apparatus. The method further comprises electronically sending a signal to store content from the plurality of terminal apparatuses to at least one storage device, the content being accessible via the community site. In response to at least one predetermined condition relating to the usage of the community site being satisfied, the method comprises electronically sending a signal to delete the content from the at least one storage device.

A further exemplary embodiment described herein is directed to at least one computer-readable medium. The at least one computer-readable medium is encoded with instructions that, when executed on at least one processing unit, cause an apparatus to manage a community site in accordance with management data so as to permit access to the community site by a plurality of terminal apparatuses based at least in part on terminal data from each of the plurality of terminal apparatuses. The terminal data indicates at least one of a time or a location associated with the terminal apparatus. When executed on the at least one processing unit, the instructions further cause the apparatus to electronically send a signal to store content from the plurality of terminal apparatuses, the content being accessible via the community site and electronically send, in response to at least one predetermined condition relating to the usage of the community site being satisfied, a signal to delete the content.

Another exemplary embodiment described herein is directed to an apparatus for accessing a community site. The community site is managed by a server in accordance with management data so as to permit access to the community site by a plurality of terminal apparatuses based at least in part on terminal data from each of the plurality of terminal apparatuses. The terminal data indicates at least one of a time or a location associated with the terminal apparatus. The apparatus for accessing the community site comprises a communication unit, at least one memory to store processor-executable instructions, and a processing unit communicatively coupled to the communication unit and the at least one memory. Upon execution of the processor-executable instructions by the processing unit, the processing unit controls the communication unit to send an instruction to the server to establish the community site and controls the communication unit to receive data relating to at least one content item accessible via the community site. In response to at least one predetermined condition relating to the usage of the community site being satisfied, the at least one content item is caused to be inaccessible to the apparatus via the community site.

Advantageous Effects of Invention

According to various techniques described herein, a community site can be used with more peace of mind.

BRIEF DESCRIPTION OF DRAWINGS

FIG. 3 is a block diagram illustrating an example of the functional configuration of a content item management unit.

FIG. 5 is a diagram illustrating the details of content management data.

FIG. 13 is a flowchart of the content item disclosing process.

FIG. 14 is a block diagram illustrating an example of the hardware configuration of a computer.

DESCRIPTION OF EMBODIMENTS

Hereinafter, an embodiment of the present technique will be described with reference to the drawings.

<Example of Configuration of Community Site Providing System>

Figure 1:
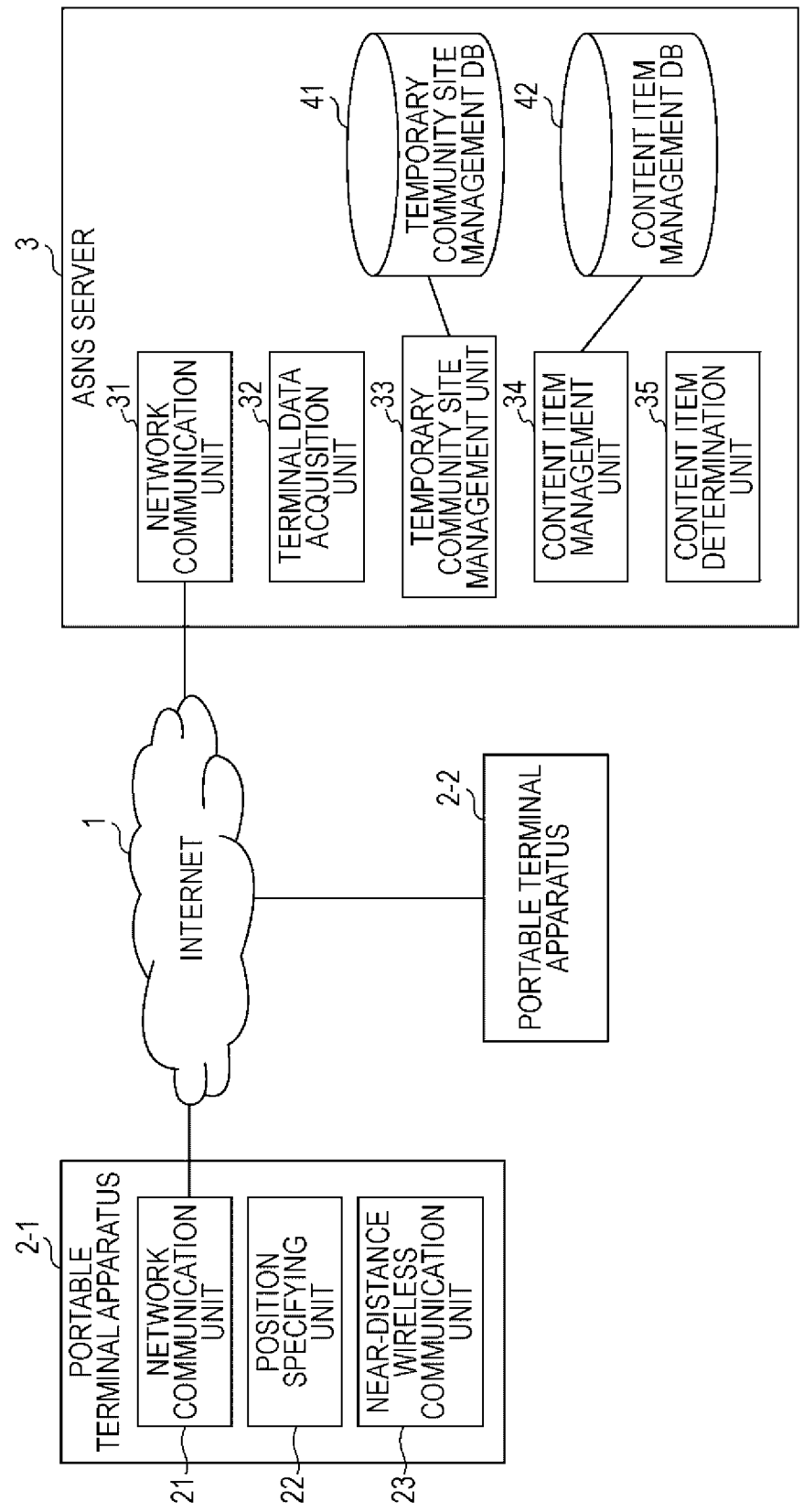
FIG. 1 is a diagram illustrating an example of the configuration of a community site providing system serving as an information processing system according to an embodiment of the present technique.

FIG. 1 is a diagram illustrating an example of the configuration of a community site providing system serving as an information processing system according to an embodiment of the present technique.

In the community site providing system shown in FIG. 1, portable terminal apparatuses 2-1 and 2-2 and an ASNS (Ad-hoc Social Network Service) server 3 are connected to each other via the Internet 1 serving as a network. Hereinafter, when it is not necessary to distinguish the portable terminal apparatuses 2-1 and 2-2 from each other, the portable terminal apparatuses 2-1 and 2-2 are simply referred to as the portable terminal apparatuses 2.

The portable terminal apparatuses 2 are communication terminal apparatuses that users can carry and include portable telephones, PDAs (Personal Digital Assistants), portable game consoles, and note-type personal computers.

The portable terminal apparatus 2 includes a network communication unit 21, a position specifying unit 22, and a near-distance wireless communication unit 23.

The network communication unit 21 communicates with the ASNS server 3 via the Internet 1.

The position specifying unit 22 has a GPS (Global Positioning System) reception function or a positioning function using a base station or a wireless LAN (Local Area Network). The position specifying unit 22 specifies the position of the portable terminal apparatus 2 and creates terminal data indicating the position of the portable terminal apparatus 2.

The near-distance wireless communication unit 23 executes ad-hoc communication with another portable terminal apparatus 2 using a near-distance wireless communication function such as infrared rays or Bluetooth (registered trademark). Specifically, the near-distance wireless communication unit 23 searches for another portable terminal apparatus 2 present within a predetermined nearby range as a communication partner. When the near-distance wireless communication unit 23 finds the communication partner, the near-distance wireless communication unit 23 accesses the communication partner. Further, the near-distance wireless communication unit 23 exchanges a content item such as text data or image data with the portable terminal apparatus 2 as the communication partner, and then disconnects the communication.

The network communication unit 21 transmits the terminal data indicating the position of the portable terminal apparatus 2 specified by the position specifying unit 22 to the ASNS server 3. Further, after the near-distance wireless communication unit 23 executes the near-distance wireless communication, the network communication unit 21 may transmit the terminal data as information regarding the near-distance wireless communication to the ASNS server 3.

Moreover, the network communication unit 21 is configured to transmit the terminal data indicating the position of the portable terminal apparatus 2 to the ASNS server 3. However, when the portable terminal apparatus 2 has data, which is used to specify the portable terminal apparatus 2, such as from a camera function, an object such as image data imaged by the portable terminal apparatus 2 or text data input through an operation which a user executes on the portable terminal apparatus 2 may be transmitted as the terminal data.

Moreover, the network communication unit 21 receives web page data transmitted from the ASNS server 3 and displays the web page data on a display serving as a display unit (not shown) by the use of a web browser. The web browser requests, acquires, and displays the web page data described by a language such as HTML (Hyper Text Markup Language) in conformity with HTTP (Hyper Text Transfer Protocol) as the standard protocol of the Internet 1, and transmits or the like form data.

Moreover, the network communication unit 21 can also transmit and receive data using a dedicated application as well as transmitting and receiving data such as the web page data through the web browser. The web page data is described by HTML and may also be described by another language such as XML (Extensible Markup Language) or JSON (JavaScript Object Notation). The communication protocol is not limited to HTTP, but another communication protocol such as FTP (File Transfer Protocol) may be used.

The ASNS server 3 manages the terminal data transmitted from each of the portable terminal apparatuses 2. The ASNS server 3 realizes the ASNS using the terminal data from the portable terminal apparatuses 2 and provides the users of the portable terminal apparatuses 2 with a community site which only the portable terminal apparatuses 2 sharing the same space and time can access. The community site provides content items such as text data, images, and music of blogs or the like created by the users of the portable terminal apparatuses 2. Further, the community site is a temporary community site which only members (users) present at a place can access and is referred to as a temporary community site below.

Further, the ASNS server 3 can provide the users of the portable terminal apparatuses 2 with the community site, which only the portable terminal apparatuses 2 sharing substantially the same space and time and representing a common or similar person, photo or password (common or similar object) can access, as a temporary community site by managing the terminal data as the objects, such as predetermined images or text data, transmitted from each of the portable terminal apparatuses 2.

That is, the temporary community site provided by the ASNS server 3 is created, so to speak, in accordance with the degree of similarity between the terminal data transmitted from the respective portable terminal apparatuses 2.

The ASNS server 3 includes a network communication unit 31, a terminal data acquisition unit 32, a temporary community site management unit 33, a content item management unit 34, a content item determination unit 35, a temporary community site management DB (database) 41, and a content item management DB 42.

The network communication unit 31 communicates with the portable terminal apparatus 2 via the Internet 1.

The terminal data acquisition unit 32 ascertains the position of the portable terminal apparatus 2 by acquiring the terminal data of the portable terminal apparatus 2 which is received when the network communication unit 31 communicates with the portable terminal apparatus 2.

The temporary community site management unit 33 manages the temporary community site which only the specific portable terminal apparatuses 2 can access. Specifically, the temporary community site management unit 33 manages the temporary community site using temporary community site management data which is data regarding the temporary community site.

The content item management unit 34 manages content items such as blogs, images, or music which are created by the users of the portable terminal apparatuses 2 and are opened on the temporary community site. Specifically, the content item management unit 34 manages the content items using content item management data which are data regarding the content items.

The content item determination unit 35 determines whether the content items opened on the temporary community site are legitimate content items.

The temporary community site management DB 41 determines whether the temporary community site management data which is the data regarding the temporary community site. The temporary community site management data includes a temporary community ID (Identifier) used to specify the temporary community site or information used to specify the portable terminal apparatus 2 forming the temporary community site.

The content item management DB 42 stores the content item management data which are the data regarding the content items opened on the temporary community site. The content item management data is present on each temporary community site on which the content items are opened and includes information or a registration time used to specify the portable terminal apparatus 2 receiving an instruction to register the content item opened on the temporary community site and information regarding classification of the content items.

<Example of Functional Configuration of Temporary Community Site Management Unit>

Next, an example of the functional configuration of the temporary community site management unit 33 will be described with reference to FIG. 2.

Figure 2:
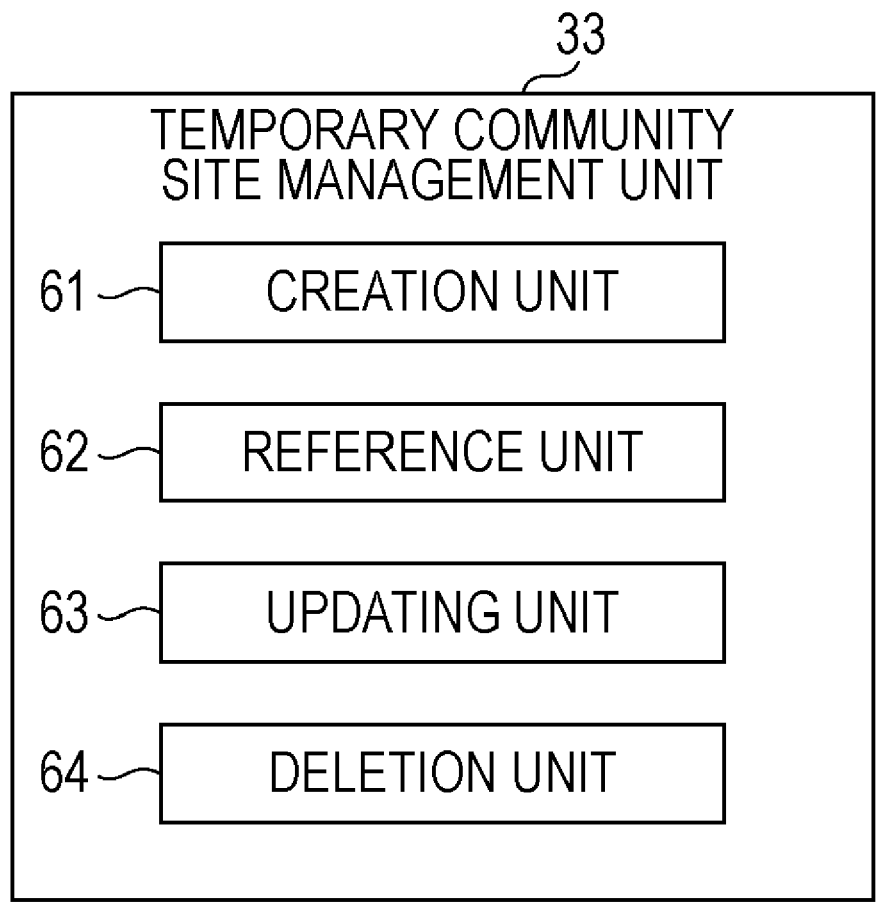
FIG. 2 is a block diagram illustrating an example of the functional configuration of a temporary community site management unit.

The temporary community site management unit 33 in FIG. 2 includes a creation unit 61, a reference unit 62, an updating unit 63, and a deletion unit 64.

The creation unit 61 creates the temporary community site, which only the portable terminal apparatuses 2 treated by the users (members) at the place can access, based on the terminal data from the plurality of portable terminal apparatuses 2 and an instruction to create the temporary community site from one of the plurality of portable terminal apparatuses 2, creates the temporary community site management data used to manage the temporary community site, and stores the created temporary community site in the temporary community site management DB 41.

The reference unit 62 makes reference to the temporary community site management data of the temporary community site management DB 41 in response to an instruction from the temporary terminal apparatus 2.

The updating unit 63 updates the temporary community site management data of the temporary community site management DB 41 in response to an instruction from the temporary terminal apparatus 2.

The deletion unit 64 deletes the temporary community site management data of the temporary community site management DB 41. Further, the deletion unit 64 deletes the content item opened on the deleted temporary community site and deletes the corresponding content item management data from the content item management DB 42. Furthermore, the deletion unit 64 can delete the temporary community site management data and delete the corresponding temporary community site itself, as necessary.

<Creation Example of Temporary Community Site Management Data>

Hereinafter, a detailed example of the temporary community site management data used to manage the temporary community site will be described with reference to FIG. 3.

As shown in FIG. 3, the temporary community site management data includes a temporary community ID, a setting range, a constituent user, an attribute, a final update time stamp, and an NG content item.

The temporary community ID is information used to specify the temporary community site. The setting range is information indicating a position range in which the portable terminal apparatus 2 forming the temporary community site is present in order to maintain the temporary community site. For example, the setting range is information regarding a predetermined range with reference to a position (latitude and longitude) at which the portable terminal apparatuses 2 execute near-distance wireless communications with each other or a position of the center (center of gravity) of the plurality of portable terminal apparatuses 2.

The constituent user is used to specify the portable terminal apparatus 2 forming the temporary community site. For example, the constituent user is information such as an IP (Internet Protocol) address. The attribute is information indicating whether the members as the users of the portable terminal apparatuses 2 create the temporary community site regarding any meeting (event).

The final update time stamp is information regarding the latest time at which the content item opened on the temporary community site is updated. The NG content item is information regarding the content item referred and compared to avoid (restrict) the opening on the temporary community site. For example, the NG content item is set when the temporary community site is created. The NG content item may be set by default.

In the example of FIG. 3, for example, the temporary community site specified by the temporary community ID "c_1" is configured such that a radius 50 m about the latitude and longitude "X1Y1" is set as the setting range and is formed by three portable terminal apparatuses 2 expressed by "IP1", "IP2", and "IP10." Further, the temporary community site specified by the temporary community ID "c_1" is created at a "feast." A content item is updated at "5:10 on March 3, 2011" and text data including a content item (text data) NG word described in an "NG.txt" file is the NG content item.

Moreover, for example, the temporary community site specified by the temporary community ID "c_2" is configured such that a radius 10 m about the latitude and longitude "X2Y2" is set as the setting range and is formed by three portable terminal apparatuses 2 expressed by "IP3", "IP4", and "IP5." Further, the temporary community site specified by the temporary community ID "c_2" is created at a "wedding ceremony." A content item is updated at "23:10 on March 3, 2011" and a content item which is the same as or similar to image data of a content item "aaa.mpg" file is the NG content item. The similarity of the image data can be determined using the existing image processing technique.

Moreover, for example, the temporary community site specified by the temporary community ID "c_3" is configured such that a radius 10 m about the latitude and longitude "X3Y3" is set as the setting range and is formed by five portable terminal apparatuses 2 expressed by "IP6", "IP7", "IP8", "IP9" and "IP12." Further, the temporary community site specified by the temporary community ID "c_3" is created at an "alumni meeting." A content item is updated at "7:20 in March 3, 2011" and a content item which is the same as or similar to audio data (music data) of a content item (audio data) "bbb.mp3" file is the NG content item. The similarity of the audio data can be determined using the existing audio processing technique.

The temporary community site management unit 33 manages the temporary community sites based on the temporary community site management data.

Example of Functional Configuration of Content Item Management Unit

Next, an example of the functional configuration of the content item management unit 34 will be described with reference to FIG. 4.

Figure 4:
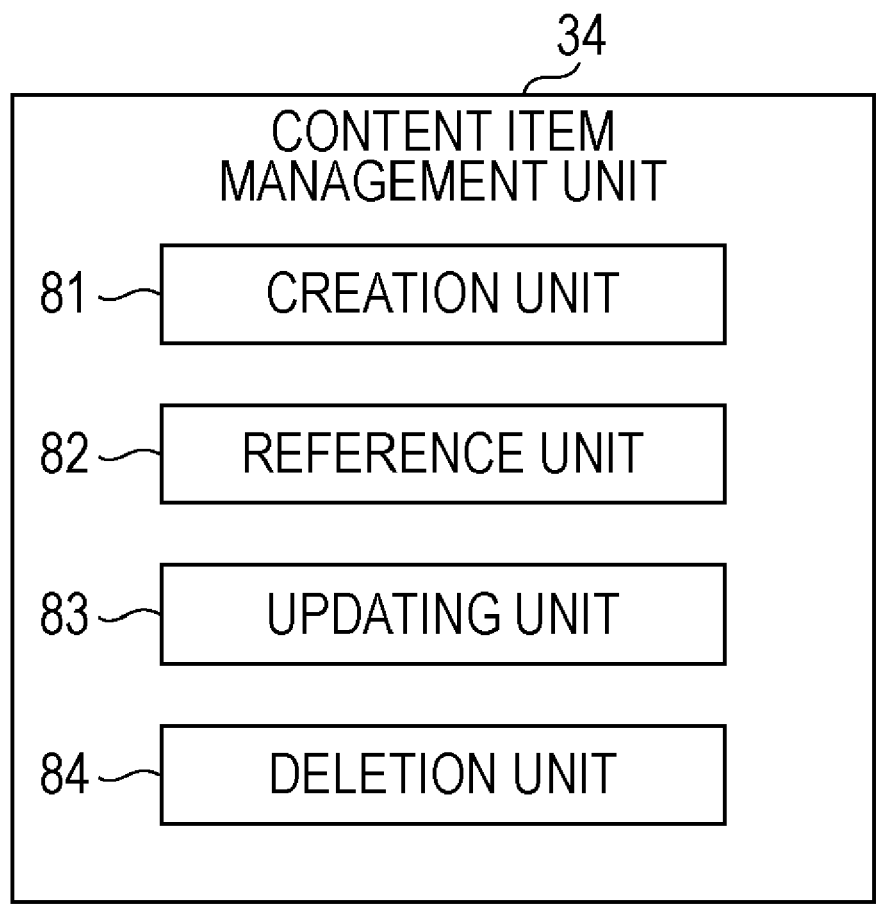
FIG. 4 is a diagram illustrating the details of temporary community site management data.

The content item management unit 34 in FIG. 4 includes a creation unit 81, a reference unit 82, an updating unit 83, and a deletion unit 84.

The creation unit 81 registers the content item opened on the temporary community site based on an instruction, which is given from, for example, one of the portable terminal apparatuses 2 forming the temporary community site, to register the content item, creates the content item management data used to manage the content item, and stores the created content item management data in the content item management DB 42.

The reference unit 82 makes reference to the content item management data of the content item management DB 42 in response to the instruction from the portable terminal apparatus 2.

The updating unit 83 updates the content item management data of the content item management DB 42 in response to the instruction from the portable terminal apparatus 2.

The deletion unit 84 deletes the content item management data of the content item management DB 42 in response to the instruction from the portable terminal apparatus 2.

<Detailed Example of Content Item Management Data>

Hereinafter, a detailed example of the content item management data used to manage the content item opened on the temporary community site will be described with reference to FIG. 5.

As shown in FIG. 5, the content item management data includes a registration ID, a user ID, a registration time, a valid period, classification, and an open flag.

The registration ID is information used to specify each content item registered on a predetermined temporary community site. The user ID is information such as an IP address used to specify the portable terminal apparatus 2 of the user giving an instruction to register the content item on the temporary community site.

The registration time is information regarding the time at which the instruction to register the content item is given on the temporary community site. The valid period is information regarding the time at which the content item is deleted on the opened community site. The time is a time after one day from the registration time.

The classification is information regarding the classification of the content item registered on the temporary community site. The open flag is information indicating whether the content item corresponding to the content item management data is opened or not (OK or NG).

The content item management data in FIG. 5 is an example of the content item management data used to manage the content item opened on the temporary community site specified by the temporary community ID "c_1" of the temporary community site management data in FIG. 3.

In the example of FIG. 5, for example, the content item specified by the registration ID "1" is registered at "10:00 February 9. 2011" by the portable terminal apparatus 2 specified by "IP1" and "10:00 February 10. 2011" is the valid period. The content item specified by the registration ID "1" is a "blog" and is a content item of which the openness is "OK."

Further, for example, the content item specified by the registration ID "2" is registered at "9:00 February 9. 2011" by the portable terminal apparatus 2 specified by "IP2" and "9:00 February 10. 2011" is the valid period. The content item specified by the registration ID "2" is a "music content item" and is a content item of which the openness is "OK."

Furthermore, for example, the content item specified by the registration ID "3" is registered at "10:00 February 14. 2011" by the portable terminal apparatus 2 specified by "IP10" and "10:00 February 15. 2011" is the valid period. The content item specified by the registration ID "3" is a "moving image content item" and is a content item of which the openness is "OK."

The content item management unit 34 manages the content item opened on the temporary community site based on the content item management data.

Meanwhile, when a temporary community site is created at an event such as a feast, a wedding ceremony, or an alumni meeting by the members (users) at this place and he place ends without deep association (relationship) between the members, there is a concern that the manager may not manage the community site. Therefore, there is a concern that the community site may be left unmanaged.

Accordingly, deletion of the temporary community in the community site providing system according to the embodiment of the present technique will be described below.

Temporary Community Deletion Process

Figure 6:
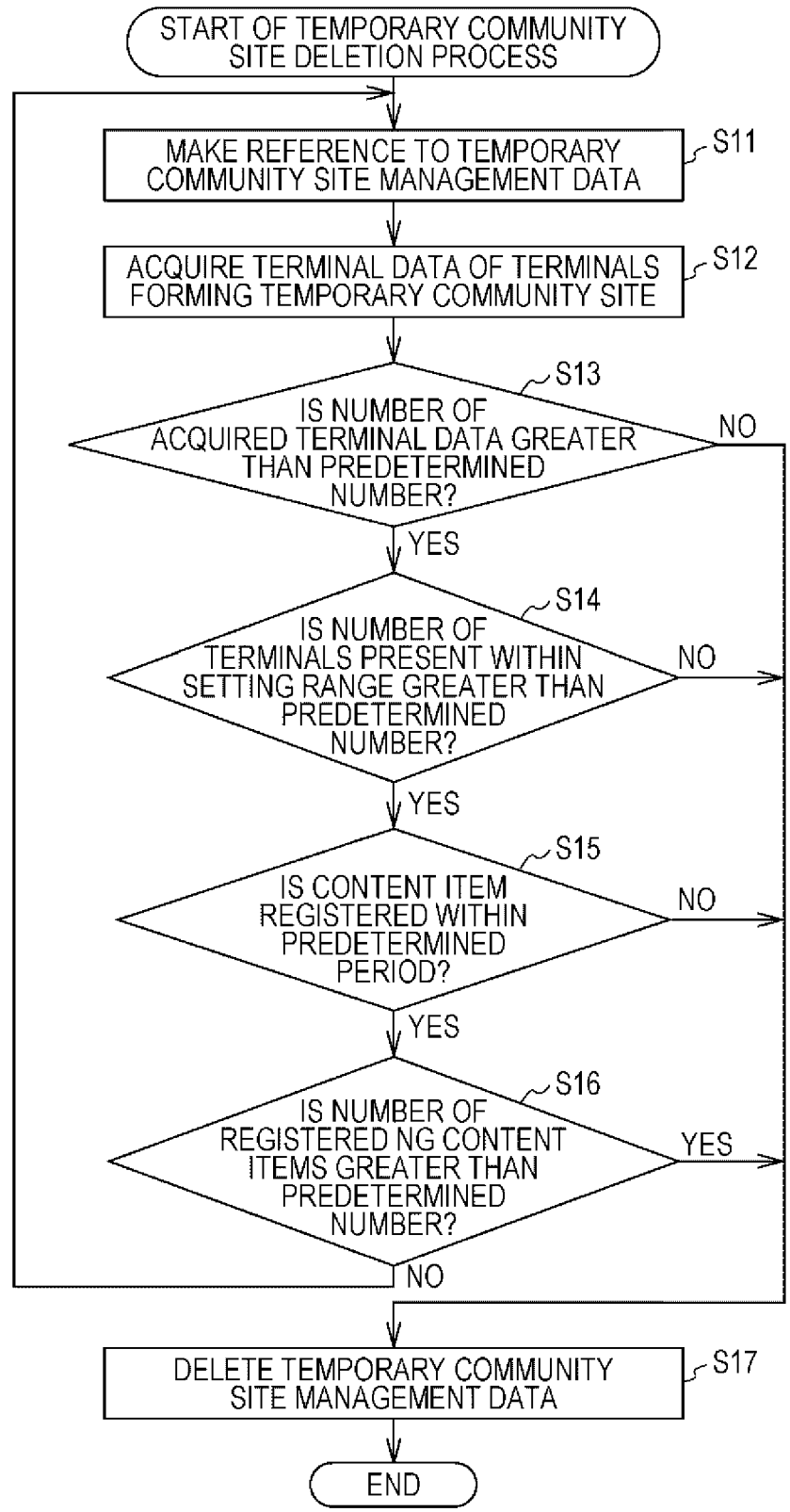
FIG. 6 is a flowchart of a temporary community site deletion process.

FIG. 6 is a flowchart illustrating a temporary community site deletion process in the community site providing system according to an embodiment of the present technique. The temporary community site deletion process is performed for each temporary community site by the ASNS server 3.

In step S11, the reference unit 62 of the temporary community site management unit 33 makes reference to the temporary community site management data stored in the temporary community site management DB 41.

In step S12, the terminal data acquisition unit 32 acquires the terminal data which is received through communication with the network communication unit 31 of the portable terminal apparatus 2 and indicates the position of the portable terminal apparatus 2 forming the temporary community site.

In step S13, the deletion unit 64 of the temporary community site management unit 33 determines whether the number of terminal data acquired by the terminal data acquisition unit 32 is greater than a predetermined number. For example, this predetermined number is 75% of the number of portable terminal apparatuses 2 indicated by the constituent users of the temporary community site management data.

When it is determined that the number of terminal data is greater than the predetermined number in step S13, the process proceeds to step S14.

In step S14, the deletion unit 64 of the temporary community site management unit 33 determines whether the number of portable terminal apparatuses 2 present within the setting range of the temporary community site management data is greater than a predetermined number based on the terminal data acquired by the terminal data acquisition unit 32. For example, this predetermined number is 50% of the number of portable terminal apparatuses 2 indicated by the constituent users of the temporary community site management data.

When it is determined that the number of portable terminal apparatuses 2 is greater than the predetermined number in step S14, the process proceeds to step S15.

In step S15, the deletion unit 64 of the temporary community site management unit 33 determines whether a new content item is registered on the temporary community within a predetermined period such as 30 minutes from the current time based on the final update time stamp and the current time of the temporary community site management data.

When it is determined that the new content item is registered within the predetermined period in step S15, the process proceeds to step S16.

In step S16, the deletion unit 64 of the temporary community site management unit 33 determines whether the number of content items of which the openness is NG on the temporary community site is greater than a predetermined number on the temporary community site. Specifically, for example, the deletion unit 64 determines whether statistical data (for example, a ratio of NG content items to all of the content items registered in the temporary community site) obtainable based on the result of the content item determination process performed by the content item determination unit 35 when each content item is registered in the temporary community site is greater than a predetermined ratio.

<Content Item Determination Process>

Figure 7:
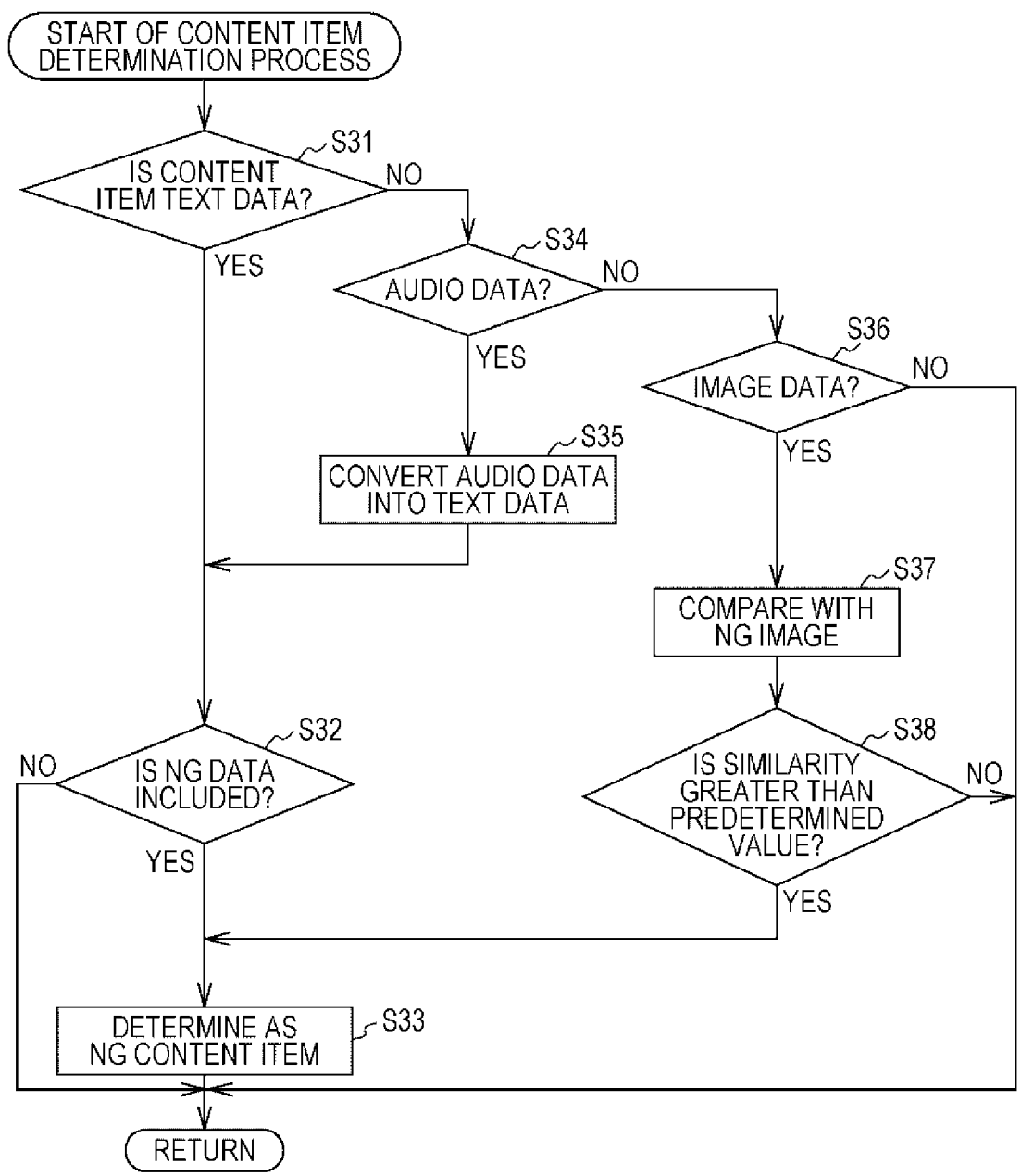
FIG. 7 is a flowchart of a content item determination process.

Hereinafter, the content item determination process of the content item determination unit 35 will be described with reference to FIG. 7. The content item determination process is performed for each content item opened on the temporary community site specified by the temporary community site management data and is performed when the content item is registered in the temporary community site. Hereinafter, the content item to be subjected to the content item determination process is a target content item.

In step S31, the content item determination unit 35 determines whether the target content item is, for example, text data forming sentences of a blog.

In step S31, when it is determined that the target content item is the text data, the process proceeds to step S32. The content item determination unit 35 determines whether the text data includes NG texts indicating words against public order and morality or words for abuse and slander of a specific individual registered as the "NG content item" of the temporary community site management data in FIG. 3.

When it is determined that the text data include the NG text in step S32, the content item determination unit 35 determines that the target content item is the NG content item in step S33 and the process ends. On the other hand, when it is determined that the text data does not include the NG text in step S32, the content item determination unit 35 does not perform any process the process ends.

On the other hand, when it is determined that the target content item is not the text data in step S31, the process proceeds to step S34. The content item determination unit 35 determines whether the target content item is audio data.

When it is determined that the target content item is the audio data in step S34, the process proceeds to step S35. The content item determination unit 35 converts the content item, which is the audio data, into text data. Thereafter, the process proceeds to step S32 to perform the subsequent processes.

On the other hand, when it is determined that the target content item is not the audio data in step S34, the process proceeds to step S36. The content item determination unit 35 determines whether the target content item is image data of a moving image or a still image.

When it is determined that the target content item is the image data of the moving image or the still image in step S36, the process proceeds to step S37. The content item determination unit 35 compares the image data, which is the target content item, and the NG image registered as the "NG content item" of the temporary community site management data in FIG. 3 to calculate a similarity in accordance with a predetermined algorithm. When the image data and the NG data are compared to each other, the same kind of image data may be compared and respective metadata may be compared to each other.

In step S38, the content item determination unit 35 determines whether the similarity between the image data and the NG image is greater than a predetermined value.

When it is determined that the similarity between the image data and the NG image is greater than the predetermined value in step S38, the process proceeds to step S33, the target content item is determined to be the NG content item, and the process ends.

When it is determined that the target content item is not the image data of the moving image or the still image in step S36 or when the similarity between the image data and the NG image is not greater than the predetermined value in step S38, any process is not performed. Then, the process ends.

In this way, it is determined whether the target content item is the NG content item or not. Further, as described above, the content item determined to be the NG content item is not opened on the temporary community site.

Now, referring back to the flowchart of FIG. 6, when it is determined that the number of registered NG content items is greater than the predetermined number in step S16, the process returns to step S11 and the processes subsequent to step S11 are performed in another temporary community site.

On the other hand, the process proceeds to step S17 when it is determined that the number of terminal data acquired by the terminal data acquisition unit 32 is not greater than the predetermined number in step S13, when it is determined that the number of portable terminal apparatuses 2 present within the setting range is not greater than the predetermined number in step S14, when it is determined that no new content item is registered within the predetermined period in step S15, or when it is determined that the number of registered NG content items is not greater than the predetermined number in step S16.

In step S17, the deletion unit 64 of the temporary community site management unit 33 deletes the temporary community site management data regarding the temporary community site stored in the temporary community site management DB 41. Further, the deletion unit 64 deletes the content item opened on the deleted temporary community site and deletes the content item management data regarding the content item stored in the content image management DB 42. Furthermore, at this time, the deletion unit 64 may delete the temporary community site management data regarding the temporary community site and may delete the corresponding temporary community site itself.

According to the above-described process, the temporary community site is deleted without performing any operation of the manager or the like when an event such as an alumni meeting is finished, the members as the users of the portable terminal apparatuses 2 forming the temporary community site are dismissed and are distant from each other, or no new content item is registered during a given period. Accordingly, the users can use the community site in relief since the temporary community site is not left unmanaged after an event such as a feast, a wedding ceremony, or an alumni meeting is finished and the information regarding the temporary community site can be prevented from being leaked by any means, for example, so that a third person cannot secretly look at the information.

Moreover, business can be carried out securely since the information can be prevented from being leaked, for example, so that a third person cannot look at the information, the user can open the content item (for example, a top secret document or the like of a company) with high confidentiality that the user does not want to become known to people other than the members. Further, the users can carry out highly secret communication in relief since conversions exchanged on the temporary community site are not left even when the respective members can write blogs or comments on which more genuine intentions are reflected or have talks among themselves in secret at a meeting outside of the company, or all the participants at the place of a feast become drunk and thus lose their memories.

Meanwhile, as described with reference to FIG. 5, a valid period is set in the content item opened on the temporary community site. Accordingly, the content item opened on the temporary community site is deleted after the valid period before the temporary community site itself is deleted through the temporary community site deletion process described with reference to the flowchart of FIG. 6.

Accordingly, a process of updating the valid period of the content item in the community site providing system according to an embodiment of the present technique will be described below.

<Example of Valid Period Updating Process>

Figure 8:
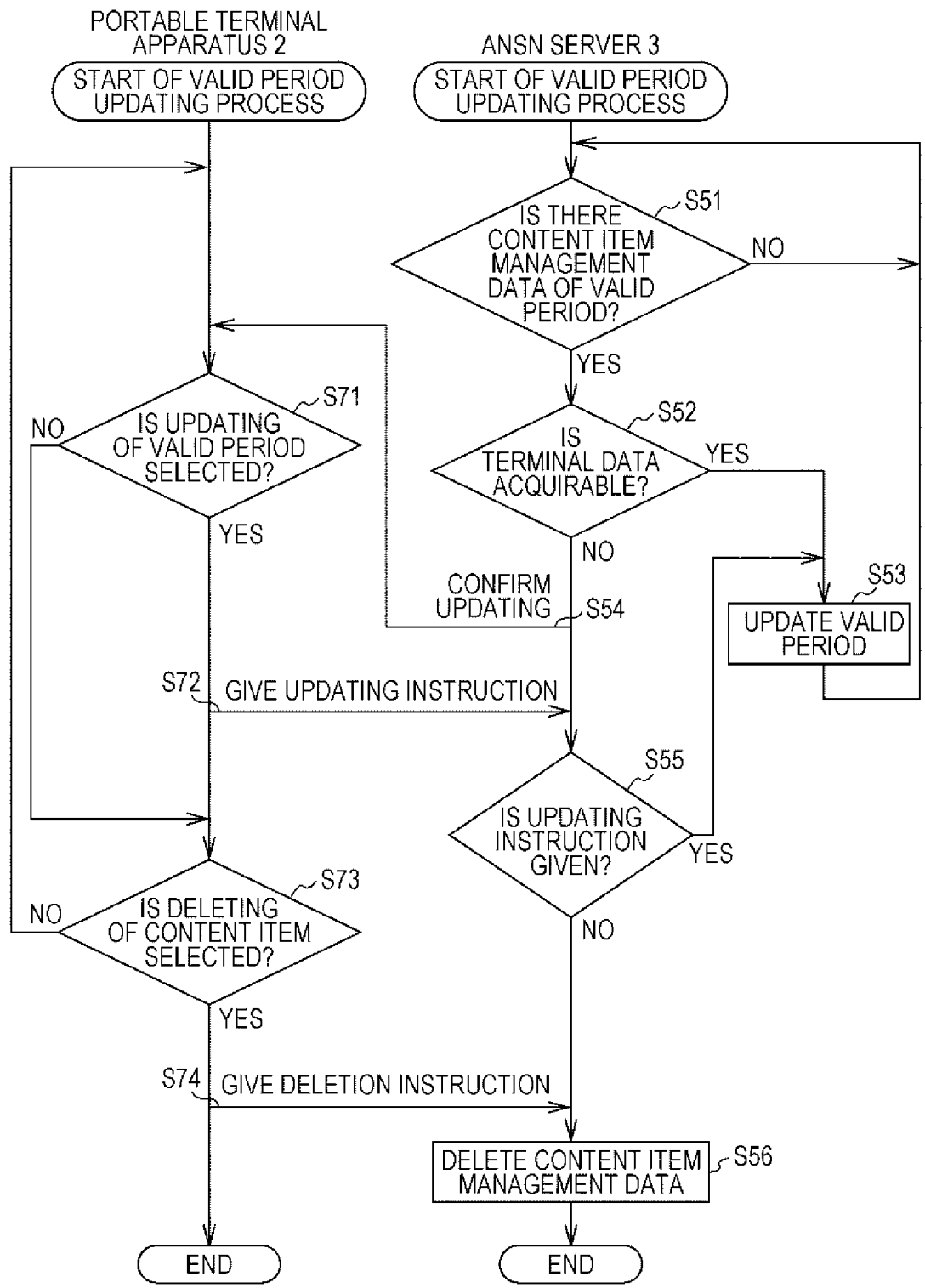
FIG. 8 is a flowchart of a valid period determination process.

FIG. 8 is a flowchart of the process of updating the valid period of the content item on the temporary community site in the community site providing system according to the embodiment of the present technique.

In step S51, the reference unit 82 of the content item management unit 34 of the ASNS server 3 determines whether there is a content item management data in which the valid period is very near with reference to the content item management table of the content item management DB 42. Further, hereinafter, the content item management data in which the valid period is very near is referred to as a deletion candidate content item management data. The process of step S51 is repeated until there is the deletion candidate content item management data.

When it is determined that there is the deletion candidate item management data in step S51, the process proceeds to step S52. The terminal data acquisition unit 32 determines whether to acquire the terminal data of the portable terminal apparatus 2 indicated by a user ID of the deletion content item management data.

When it is determined that the terminal data can be acquired in step S52, the process proceeds to step S53. The updating unit 83 of the content item management unit 34 updates the valid period of the deletion candidate content item management data from the current time to a date after three days, for example. Thereafter, the process returns to step S51 and the content item management data regarding the content item of another temporary community site is referred.

On the other hand, when it is determined that the terminal data cannot be acquired in step S52, the network communication unit 31 transmits information for confirming the valid period of the content item to the portable terminal apparatus 2 indicated by the user ID of the deletion candidate content item management data via the Internet 1 in step S54.

In the portable terminal apparatus 2, the network communication unit 21 receives the information from the ASNS server 3 and displays a screen on a display (not shown) so that the user updates the valid period.

Moreover, in step S71, the network communication unit 21 determines whether the updating of the valid period is selected. When it is determined that the updating of the valid period is selected in step S71, the process proceeds to step S72. The network communication unit 21 transmits information for giving an instruction to update the valid period to the ASNS server 3 via the Internet 1. At this time, the user may be allowed to select the updating of the valid period so that the user sets a desired valid period (for example, "March 31, 2111") and information indicating the valid period may also be transmitted to the ASNS server 3. The network communication unit 31 of the ASNS server 3 receives the information from the portable terminal apparatus 2. On the other hand, when it is determined that the updating of the valid period is not selected in step S71, the process of step S72 is not performed.

Now, in step S55, the updating unit 83 of the content item management unit 34 of the ASNS server 3 determines whether to receive an instruction to update the valid period of the deletion candidate content item management data in the portable terminal apparatus 2.

When it is determined that the information from the portable terminal apparatus 2 is received and the instruction to update the valid period of the deletion candidate content item management data in the portable terminal apparatus 2 is received in step S55, the process proceeds to step S53 and the valid period of the deletion candidate content item management data is updated. At this time, when the information from the portable terminal apparatus 2 includes information on the valid period, the valid period of the deletion candidate content item management data is updated to the valid period set by the user.

On the other hand, when it is determined that the information from the portable terminal apparatus 2 is not received and the instruction to update the valid period of the deletion candidate content item management data in the portable terminal apparatus 2 is not received in step S55, the process proceeds to step S56. The deletion unit 84 of the content item management unit 34 deletes the deletion candidate content item management data. At this time, the deletion unit 84 deletes the information (IP address or the like) same as the user ID of the deletion candidate content item management data in the constituent users of the temporary community site management data stored in the temporary community site management DB 41.

On the other hand, in step S73, the network communication unit 21 of the portable terminal apparatus 2 displays a screen for allowing the user to select the deletion of the content item on the display (not shown) and determines whether the user selects the deletion of the content item. When it is determined that the user selects the deletion of the content item in step S73, the network communication unit 21 transmits information for giving an instruction to delete the content item management data to the ANSN server 3 via the Internet 1 in step S74. The network communication unit 31 of the ASNS server 3 receives the information from the portable terminal apparatus 2. The deletion unit 84 of the content item management unit 34 deletes the deletion candidate content item management data in step S56.

Further, when it is determined that the user does not select the deletion of the content item in step S73, the process returns to step S71 to repeat the subsequent processes.

According to the above-described processes, the valid period of the content item can be updated and the content item cannot be deleted during the presence of the temporary community site even when the content item opened on the temporary community site is within the valid period.

Further, according to the above-described processes, the valid period may be updated by allowing the user to set the valid period of the content item or the content item may be deleted in response to an instruction of the user irrespective of the valid period. Thus, when the temporary community site is created at an event such as a feast, a wedding ceremony, or an alumni meeting and then one of the members becomes distant from the place due to an urgent event or an upset feeling, the member can continuously open the content item registered by the member to the other members by setting the valid period of the content item and updating the valid period. Furthermore, the member may not open the content item registered by the member on the temporary community site to the other member by selecting the deletion of the content item.

Accordingly, even after the user becomes distant from the place, the user can use the community site in relief in that the user can select the continuous openness or the deletion of the content item registered by the user on the temporary community site.

As described above, the user is informed of the fact that the valid period of the content item ends, when the ASNS server 3 transmits the information for confirming the updating of the content item to the portable terminal apparatus 2 of the user. However, after the user becomes distant from the place, the user may be allowed to inquire of the valid period of the content item from the user herself or himself.

Hereinafter, a process of updating the valid period of the content item will be described when the user becomes distant from the place and then the user is allowed to inquire the valid period of the content item from the user herself or himself.

Another Example of Valid Period Updating Process

Figure 9:
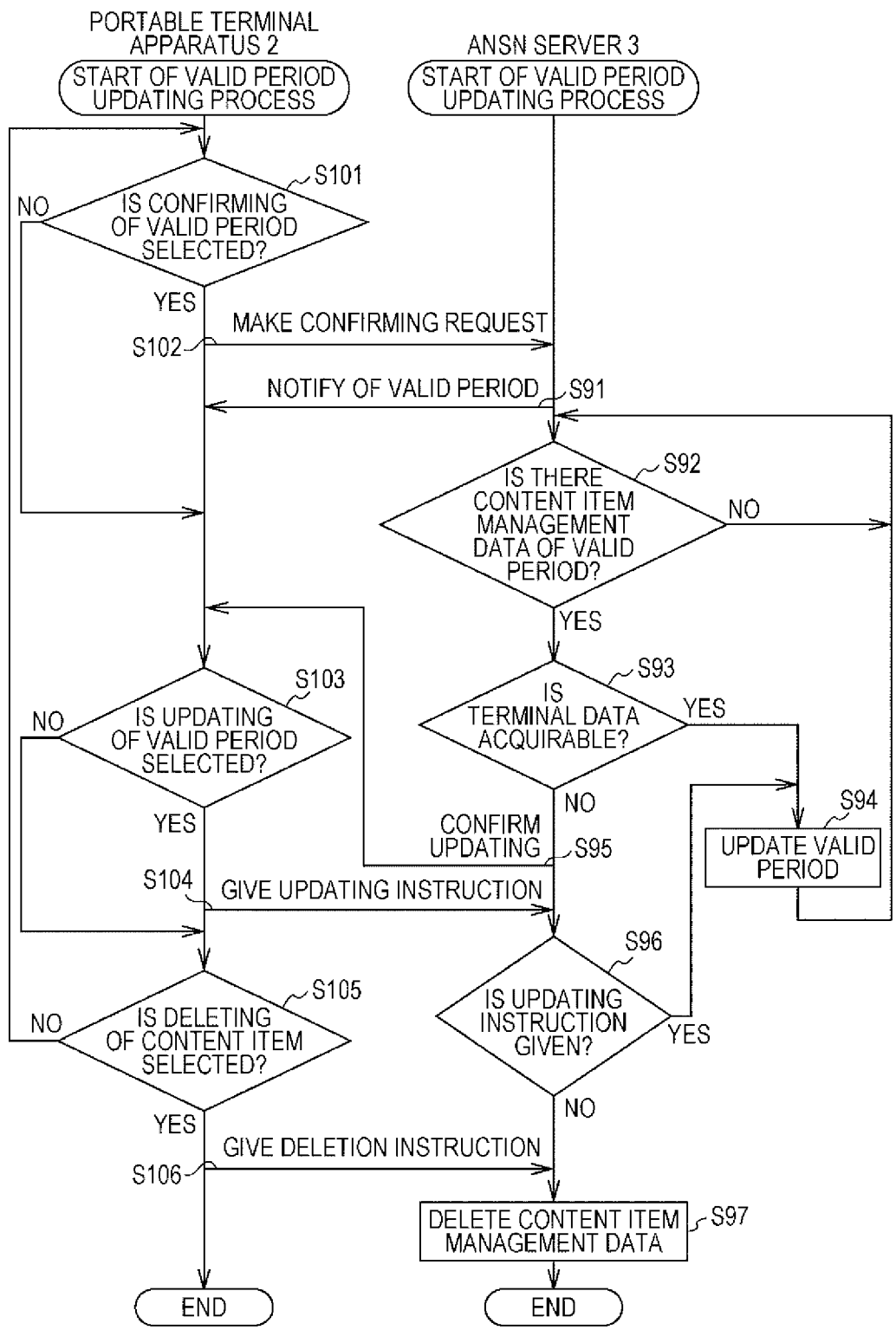
FIG. 9 is a flowchart of the valid period determination process.

FIG. 9 is a flowchart of a valid period updating process when a user is allowed to inquire of the valid period of the content item from the user.

Further, since the process of step S92 to step S97 and step S103 to step S106 in the flowchart of FIG. 9 are basically the same as those of step S51 to S56 and step S71 to step S74 in the flowchart of FIG. 8, the description thereof will not be repeated.

In the portable terminal apparatus 2, the network communication unit 21 determines whether confirming of the valid period is selected in step S101, when a screen for allowing the user to select the confirming of the valid period is displayed on the display (not shown) through an operation of the user. When it is determined that the confirming of the valid period is determined in step S101, the process proceeds to step S102. The network communication unit 21 transmits information regarding a request for confirming of the valid period to the ASNS server 3 via the Internet 1.

In the ASNS server 3, when the network communication unit 31 receives the information from the portable terminal apparatus 2, the reference unit 82 of the content item management unit 34 retrieves the valid period in the content item management data of the user ID corresponding to the portable terminal apparatus 2 having transmitted the information with reference to the content item management data of the content item management DB 42 in step S91. Further, the network communication unit 31 notifies the portable terminal apparatus 2, which has given the request for confirming the valid period of the valid period, of the content item as the retrieval result via the Internet 1.

According to the above-described process, even when the user becomes distant from the place, the user can know the valid period of the content item from the user herself or himself and can also obtain the same advantages as those described with reference to the flowchart of FIG. 8.

Meanwhile, after the members who are the users of the portable terminal apparatuses 2 forming the temporary community site are dismissed due to the end of an event such as a feast, a wedding ceremony, or an alumni meeting, the members gather again in some cases. However, when the members forming the temporary community site are dismissed and become distant from the place, as described with reference to the flowchart of FIG. 6, the temporary community site is deleted soon. Therefore, even when the members gather again, the members may not access the temporary community site.

Accordingly, a temporary community site takeover process in the community site providing system according to an embodiment of the present technique will be described below.

<Temporary Community Site Takeover Process>

Figure 10:
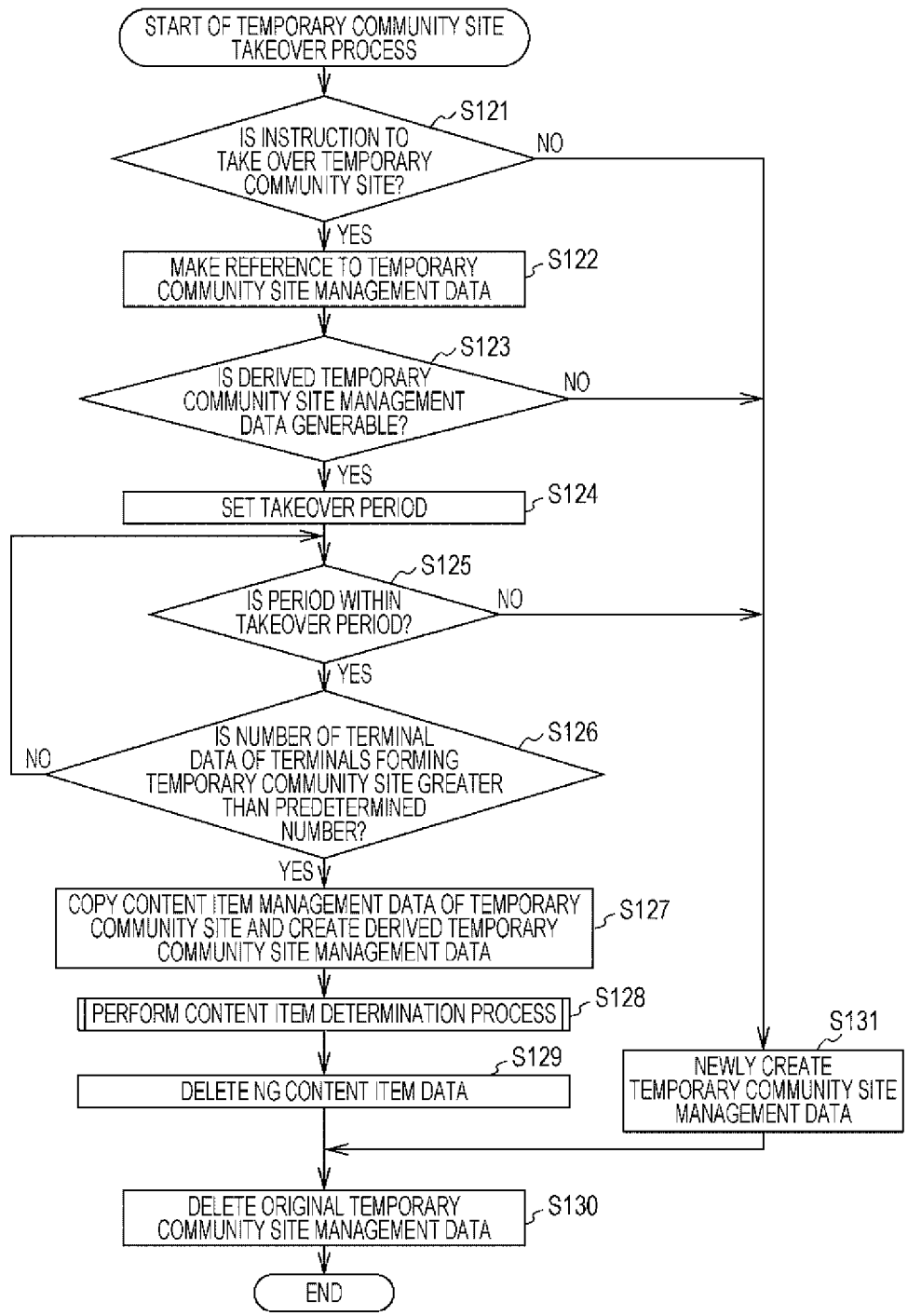
FIG. 10 is flowchart of a temporary community site takeover process.

FIG. 10 is a flowchart of the temporary community site takeover process in the community site providing system according to the embodiment of the present technique.

First, before the members are dismissed, in other words, before the temporary community site is deleted, for example, the creation unit 61 of the temporary community site management unit 33 of the ASNS server 3 determines whether the portable terminal apparatus 2 of one of the members has taken over the temporary community site in step S121.

Hereinafter, a display example of a screen displayed on the display (not shown) of the portable terminal apparatus 2 and used to give a user an instruction to take over the temporary community site will be described with reference to FIG. 11.

Figure 11:
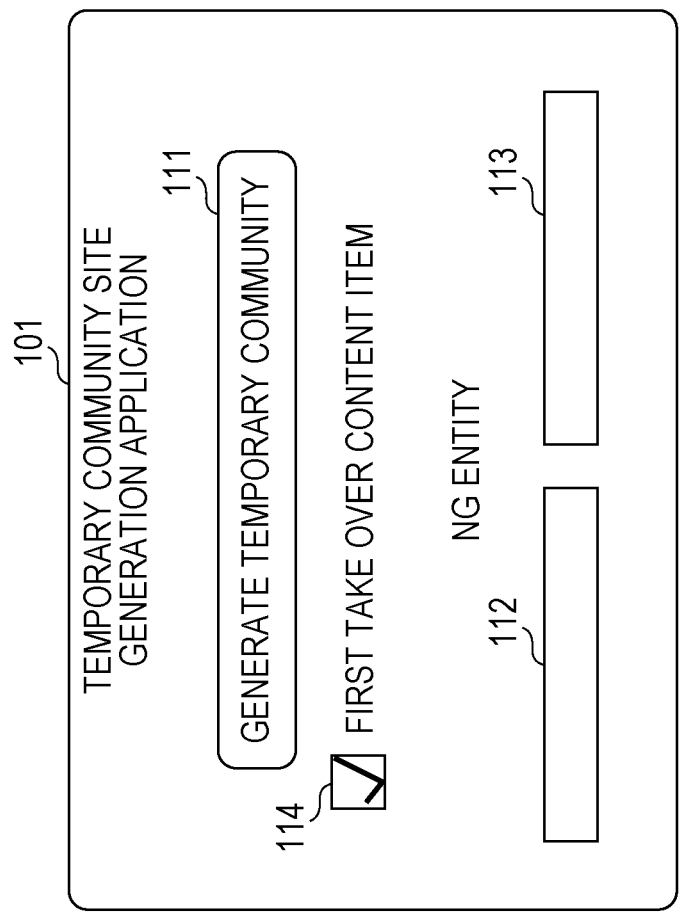
FIG. 11 is a diagram illustrating an example of a display screen for creating the temporary community site.

Words "TEMPORARY COMMUNITY CREATION APP." indicating that a display screen 101 is a screen of an application for creating the temporary community site are displayed in the upper portion of the display screen 101 shown in FIG. 11. A temporary community creation button 111, text boxes 112 and 113, and a check box 114 are displayed on the display screen 101.

The temporary community creation button 111 is a button selected (pressed down) when the user of the portable terminal apparatus 2 receives an instruction to create or take over the temporary community site.

The text boxes 112 and 113 are text boxes which are used to input an NG entity as the NG content item set in the temporary community site which the user receives the instruction to create or take over. Specifically, for example, the file names of files which are present on the portable terminal apparatuses 2 or the Internet 1 and are selected as the NG content items on a sub-screen (not shown) are input into the text boxes 112 and 113. In this case, when the user presses down the temporary community creation button 111, the files selected as the NG content items are acquired from the portable terminal apparatuses 2 or the Internet 1 and are transmitted to the ASNS server 3. Further, texts (NG texts) may be input directly into the text boxes 112 and 113 through an operation of the user.

Words "TAKE OVER CONTENT ITEM AT FIRST MEETING" are displayed on the right side of the check box 114. A check sign is displayed on the check box 114 through an operation of the user when the instruction to take over the temporary community site is given.

That is, when the temporary community creation button 111 is pressed down in a state where the check sign is not displayed in the check box 114, the instruction to create the temporary community site is given. When the temporary community creation button 111 is pressed down in a state where the check sign is displayed in the check box 114, the instruction to take over the temporary community site is given.

On the other hand, referring back to the flowchart of FIG. 10, the process proceeds to step S122, when it is determined that the instruction to take over the temporary community site is given in step S121, that is, when the temporary community creation button 111 is pressed down in the state where the check sign is displayed in the check box 114 in the display screen 101 of the portable terminal apparatus 2 forming the temporary community site.

In step S122, the reference unit 62 of the temporary community site management unit 33 makes reference to the temporary community site management data of the temporary community site management DB 41.

In step S123, the creation unit 61 of the temporary community site management unit 33 determines whether to create derived temporary community site management data used to manage the temporary community site associated with the creation of the temporary community site, specifically, a derived temporary community site created by taking over the temporary community site.

For example, when positive words (for example, "LET'S GO OUT AND HAVE A DRINK LATER" at a blog or a comment) or images in which a subject smiles are numerous in the content item opened on the temporary community site, the creation unit 61 determines that the derived temporary community site management data can be created in that there is a high probability that the members dealing with the portable terminal apparatuses 2 forming the temporary community site will gather again after the members are dismissed.

Further, for example, the creation unit 61 may determine whether the derived temporary community site management data can be created based on the attribute of the temporary community site management data regarding the temporary community site. Specifically, for example, when the attribute of the temporary community site management data is a "feast", the creation unit 61 determines that the derived temporary community site management data can be created in that there is a high probability that many members participate at a second meeting after the first meeting. Furthermore, for example, when the attribute of the temporary community site management data is an "alumni meeting", the creation unit 61 determines that the derived temporary community site management data may not be created in that there is a high probability that a half of the members return home.

In this way, when it is determined that the derived temporary community site management data can be created in step S123, the process proceeds to step S124. For example, the creation unit 61 sets a takeover period as a period such as one hour. When the takeover period is set, the terminal data acquisition unit 32 begins acquiring the terminal data of the portable terminal apparatuses 2 forming the temporary community site.

In step S125, the terminal data acquisition unit 32 determines whether the period is the takeover period. When it is determined that the period is the takeover period, the process proceeds to step S126.

In step S126, the terminal data acquisition unit 32 determines whether the number of acquired terminal data of the portable terminal apparatuses 2 forming the temporary community site is greater than a predetermined number.

When it is determined that the number of acquired terminal data is not greater than the predetermined number in step S126, the process returns to step S125 and the processes of step S125 and step S126 are repeated.

When it is determined that the number of acquired terminal data is greater than the predetermined number within the takeover period in step S126, the creation unit 61 copies the temporary community site management data of the temporary community site and the content item management data of the content item opened on the temporary community site and creates the derived temporary community site management data and the content item management data opened on the derived temporary community site in step S127. That is, the original temporary community site is created as a derived temporary community site and the content item opened on the original temporary community site is registered as a content item opened on the derived temporary community site. At this time, the NG content items input into the text boxes 112 and 113 in FIG. 11 are set as the NG content items of the derived temporary community site management data.

In step S128, the content item determination unit 35 performs a content item determination process of determining whether the content item opened on the derived temporary community site is a legitimate content item. Further, since the details of the content item determination process are same as those of the process described with reference to FIG. 7, the description thereof will not be repeated.

After step S128, the process proceeds to step S129 and the deletion unit 84 of the content item management unit 34 deletes, from the content item management DB 42, both the content item determined to be the NG content item among the content items opened on the derived temporary community site through the content item determination process and the corresponding content item management data.

In step S130, the deletion unit 64 of the temporary community site management unit 33 deletes the temporary community site management data which is stored in the temporary community site management DB 41 and is a copy source. Further, at this time, the deletion unit 64 deletes the temporary community site itself which is a copy source.

On the other hand, the process proceeds to step S131, when it is determined that the instruction to take over the temporary community site is not given in step S121 or it is determined that the derived temporary community site management data may not be created in step S123.

In step S131, the creation unit 61 of the temporary community site management unit 33 newly creates the temporary community site management data. At this time, the NG content items input into the text boxes 112 and 113 in FIG. 11 are set as the NG content items of the temporary community site management data. After step S131, the process proceeds to step S130 to delete the original temporary community site management data.

Further, even when the period is not the takeover period in step S125, that is, even when the number of acquired terminal data is not greater than the predetermined number within the takeover period, the process proceeds to step S131 to newly create the temporary community site management data.

According to the above-described processes, the derived temporary community site derived from the temporary community site can be created, when the members who are the users of the portable terminal apparatuses 2 forming the temporary community site due to the end of an event such as a feast, a wedding ceremony, or an alumni meeting, are dismissed and then the members gather again.

Specifically, for example, the content item (bride and groom images, congratulatory messages from their friends, or the like) opened on the temporary community site formed as the place of a wedding reception can be taken over as a content item of the derived temporary community site serving as the temporary community site formed as the second meeting place. Therefore, the members participating at the wedding reception can share the content items in the wedding reception even at the second meeting.

Further, for example, the temporary community site formed as the place of a feast can be taken over as the derived temporary community site formed as a barbecue place at which the same members participate. Alternatively, the temporary community site formed as the place of an alumni meeting held once a year can be taken over as the derived temporary community site formed as the place of an alumni meeting held in the next year.

A community site in a general SNS may not be used unless communications are normally active. However, by taking over the temporary community site as the derived temporary community site, it is possible to provide newness to the community site again to the members accessing the derived temporary community site.

Further, the NG content item can be set newly in the derived temporary community site. Therefore, for example, when the temporary community site formed as the place of a feast is taken over to the derived temporary community site formed as the place of the second meeting, a specific content item can be allowed not to be opened to new members participating from the second meeting.

Accordingly, even when a content item including a content item of complaints against a work place or a manager is opened on the temporary community site formed as the place of a feast (first feast) and the temporary community site is taken over to the derived temporary community site formed as a second feast in which the manager participates, the user can use the taken-over community site in relief by setting the NG texts with the name of the manager and setting the content item of the complaints against the manager as the NG content item.

Further, according to the process of step S126 in the flowchart of FIG. 10, the derived temporary community site is created even when all of the members of the original temporary community site do not gather. In this case, for example, the content item registered by the members who participate in the first meeting and do not participate in the second meeting is copied as a content item of the derived temporary community site. However, when an open flag is set to "NG" in the content item management data of the content item, the content item is not opened on the derived temporary community site.

However, there is a probability that the members participating in the first and second meetings or new members participating from the second meeting desire to confirm (browse) the content items registered by the members who do not participate in the second meeting.

Accordingly, a process of disclosing the content item registered by a user who does not participate in an event in which a derived temporary community site is formed will be described below.

<Example of Content Item Disclosing Process>

Figure 12:
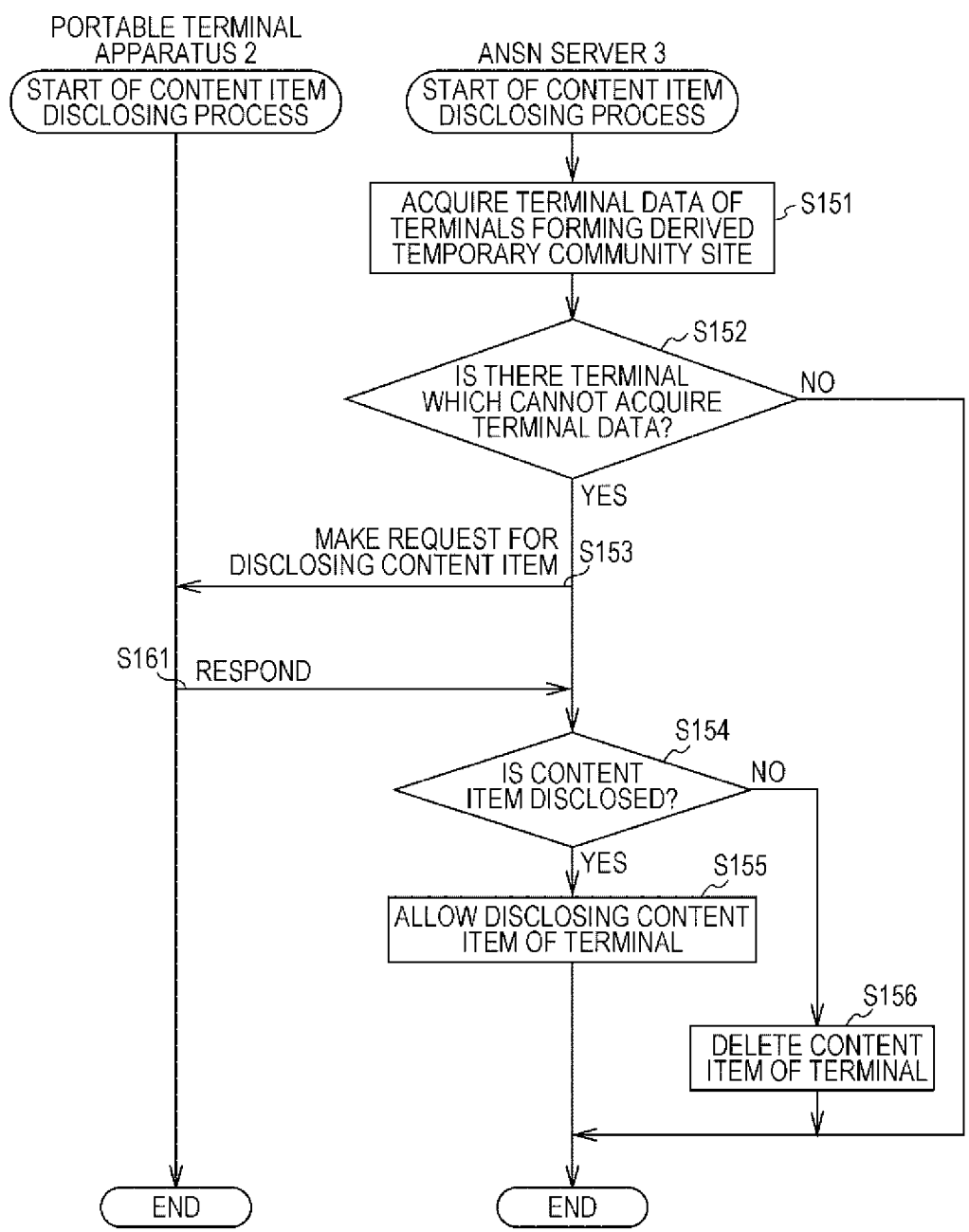
FIG. 12 is a flowchart of a content item disclosing process.

FIG. 12 is a flowchart of the process of disclosing the content item registered by the user who does not participate in an event, at which the derived temporary community site is formed, at the community site providing system according to an embodiment of the present technique.

In step S151, the terminal data acquisition unit 32 acquires the terminal data of the portable terminal apparatuses 2 forming the derived temporary community site via the network communication unit 31.

In step S152, the reference unit 62 of the temporary community site management unit 33 determines whether there is the portable terminal apparatus 2 which cannot acquire the terminal data among the portable terminal apparatuses 2 of the constituent users with reference to the constituent users of the derived temporary community site management data.

When it is determined that there is the portable terminal apparatus 2 which cannot acquire the terminal data in step S152, the network communication unit 31 transmits information regarding a request for disclosing the content item to the portable terminal apparatus 2 which cannot acquire the terminal data via the Internet 1 in step S153.

In the portable terminal apparatus 2 which does not acquire the terminal data, the network communication unit 21 receives the information from the ASNS server 3 and displays a screen for allowing the user to select whether to accept the disclosing of the content item on the display (not shown). Then, when the user selects one of the acceptance and the non-acceptance of the content item, the network communication unit 21 transmits the details selected by the user as a response to the request for disclosing the content item to the ASNS server 3 in step S161.

In the ASNS server 3, the network communication unit 31 receives the response from the portable terminal apparatus 2. In step S154, the reference unit 62 of the temporary community site management unit 33 determines whether the disclosing of the content item is OK based on the response from the portable terminal apparatus 2.

When it is determined that the disclosing of the content item is OK in step S154, that is, when the user of the portable terminal apparatus 2 selects the acceptance of the disclosing of the content item, the process proceeds to step S155.

In step S155, the reference unit 82 of the content item management unit 34 changes the open flag of the content item management data from "NG" to "OK" and allows disclosing the content item of the portable terminal apparatus 2.

On the other hand, when it is determined that the disclosing of the content item is not OK in step S154, that is, when the user of the portable terminal apparatus 2 selects the non-acceptance of the disclosing of the content item, the process proceeds to step S156.

In step S156, the deletion unit 84 of the content item management unit 34 deletes the content item of the portable terminal apparatus 2 and also deletes the corresponding content item management data from the content item management DB 42.

On the other hand, it is determined that there is no portable terminal apparatus 2 which cannot acquire the terminal data in step S152, that is, when the terminal data of all the portable terminal apparatuses 2 forming the derived temporary community site are acquired, any process is not performed and the process ends.

According to the above-described processes, for example, since the member who participates in the first meeting but does not participate in the second meeting and returns home selects whether to open the content item registered by the member herself or himself, the user can use the community site in relief irrespective of the evaluations or opinions of the members participating in the second meeting for the content item registered by the member herself or himself after returning home.

Hitherto, the process has been described in which the ASNS server 3 automatically makes the request for disclosing the content item to the member who participates in the first meeting but does not participate in the second meeting. However, a member participating in the second meeting may make the request for disclosing the content item.

Hereinafter, the disclosing of the content item made by a member participating in the second meeting will be described.

<Another Example of Content Item Disclosing Process>

FIG. 13 is a flowchart of a process of disclosing the content item for which a member participating in the second meeting makes a request.

Since the processes of step S182 to step S184 in the flowchart of FIG. 13 are basically the same as those of step S154 to step S156 in the flowchart of FIG. 12, the description thereof will not be repeated.

That is, the member participating in the second meeting operates the portable terminal apparatus 2-2, and thus the network communication unit 21 of the portable terminal apparatus 2-2 transmits, to the ASNS server 3, information regarding a request for disclosing the content item registered by the portable terminal apparatus 2-1 of the member who does not participate in the second meeting in step S171.

When the network communication unit 31 of the ASNS server 3 receives the information from the portable terminal apparatus 2-2, the network communication unit 31 transmits, to the portable terminal apparatus 2-2, a URL (Uniform Resource Locator) for accessing a web page on which the user of the portable terminal apparatus 2-1 selects the disclosing of the content item in step S181.

When the network communication unit 21 of the portable terminal apparatus 2-2 receives the URL from the ASNS server 3, the network communication unit 21 transmits the URL to the portable terminal apparatus 2-1 in step S172.

When the portable terminal apparatus 2-1 receives the URL from the portable terminal apparatus 2-1, the network communication unit 21 accesses the web page indicated by the URL in response to an operation of the user. When the web page is accessed, a screen on which the user of the portable terminal apparatus 2-1 can select the disclosing or non-disclosing of the content item is displayed on the display (not shown). Further, when the user selects one of the disclosing or non-disclosing of the content item, the network communication unit 21 transmits information indicating the disclosing or non-disclosing of the content item to the ASNS server 3 via the Internet 1.

Then, when the network communication unit 31 receives the information from the portable terminal apparatus 2, the ASNS server 3 determines whether the disclosing of the content item is OK based on the information from the portable terminal apparatus 2 in step S182.

According to the above-described processes, it is possible to obtain the same advantages as those described with reference to the flowchart of FIG. 12.

Further, when the content item registered by the portable terminal apparatus 2-1 is stored in the portable terminal apparatus 2-1 or on the Internet 1 in the flowchart of FIG. 13, the portable terminal apparatus 2-1 may transmit the information indicating the disclosing or non-disclosing of the content item to the ASNS server 3 or may upload the content item stored in the portable terminal apparatus 2-1 or on the Internet 1 to the ASNS server 3 in step S191.

Further, in the flowchart of FIG. 13, the URL is transmitted from the ASNS server 3, since the user of the portable terminal apparatus 2-1 is allowed to select the disclosing or non-disclosing of the content item. However, according to a web API (Application Program Interface) or other methods, the user of the portable terminal apparatus 2-1 is allowed to select the disclosing or non-disclosing of the content item and the ASNS server 3 may be notified of the disclosing or non-disclosing of the content item.

Furthermore, in this embodiment, the portable terminal apparatus 2 may designate "no-cache" in a pragma header or a cache-control header as a HTTP (Hyper Text Transfer Protocol) header or may designate a time limit in an expires header or a cache-control header so as not to cache the content item on the temporary community site or so as to delete the content item based on the designated time limit even when the content item is cached.

FIG. 14 is a block diagram illustrating an example of the hardware configuration of a computer executing the series of processes in the above-described ASNS server 3 in accordance with a program.

In the computer, a CPU (Central Processing Unit) 901, a ROM (Read Only Memory) 902, and a RAM (Random Access Memory) 903 are connected to each other via a bus 904.

Further, an input/output interface 905 is connected to the bus 904. An input unit 906 realized by a keyboard, a mouse, a microphone, or the like, an output unit 907 realized by a display, a speaker, or the like, a storage unit 908 realized by a hard disk, a non-volatile memory, or the like, a communication unit 909 realized by a network interface or the like, and a drive 910 driving a removable medium 911 such as a magnetic disk, an optical disc, a magneto-optical disc, or a semiconductor memory are connected to the input/output interface 905.

In the computer with the above-described configuration, the CPU 901 executes the above-described series of processes by loading and executing the program stored in the storage unit 908 on the RAM 903 via the input/output interface 905 and the bus 904.

The program executed by the computer (CPU 901) is stored in the removable medium 911 which is a package medium formed by, for example, a magnetic disk (including a flexible disk), an optical disc (CD-ROM (Compact Disc-Read Only Memory), a DVD (Digital Versatile Disc), or the like), a magneto-optical disc, or a semiconductor memory for supply. Alternatively, the program is provided via a wired or wireless transmission medium such as a local area network, the Internet, a digital satellite broadcast.

In the computer, the program can be installed in the storage unit 908 via the input/output interface 905 by mounting the removable medium 911 on the drive 910. Further, the program can be received by the communication unit 909 via a wired or wireless transmission medium and can be installed to the storage unit 908. Furthermore, the program can be installed in advance in the ROM 902 or the storage unit 908.

The program executed by the computer may be a program executed chronologically in the order described in the specification or may be a program executed in parallel or at a necessary time when called.

The embodiments of the present technique are not limited to the above-described embodiments, but may be modified in various forms within the scope of the invention without departing from the gist of the invention.

Further, the present technique can be configured as follows.

(1) An information processing apparatus includes: a community site management unit managing a community site created in accordance with a similarity between information transmitted from a plurality of terminal apparatuses; a content item management unit managing a content item registered on the community site by each terminal apparatus; and a terminal data acquisition unit acquiring terminal data transmitted from each terminal apparatus and used to specify each terminal apparatus. The community site management unit deletes both the community site and the content item on the community site based on the terminal data acquired by the terminal data acquisition unit or the content item managed by the content item management unit.

(2) In the information processing apparatus according to (1), the community site management unit deletes both the community site and the content item on the community site based on the number of terminal data indicating a position of the terminal apparatus or a state or details of the content item.

(3) In the information processing apparatus according to (1) or (2), the terminal data acquisition unit acquires the terminal data of the terminal apparatus regarding the community site when receiving an instruction to create an associated community site associated with the community site. The community site management unit copies the community site and the content item on the community site, creates the associated community site and a content item on the associated community site, and deletes the community site, which is a copy source, and the content item on the community site, when the number of terminal data acquired by the terminal data acquisition unit is greater than a predetermined number.

(4) In the information processing apparatus according to (3), the community site management unit copies the community site and the content item on the community site and creates the associated community site and the content item on the associated community site, when the community site management unit receives an instruction to create the associated community site and then the number of terminal data acquired by the terminal data acquisition unit is greater than the predetermined number within a predetermined period.

(5) The information processing apparatus according to (4), further includes a communication unit transmitting a request for disclosing the content item on the associated community site registered by the terminal apparatus to the terminal apparatus of which the terminal data is not acquired by the terminal data acquisition unit. The content item management unit deletes the content item on the associated community site in response to the request for disclosing the content item from the terminal apparatus.

(6) An information processing method of an information processing apparatus which includes a community site management unit managing a community site created in accordance with a similarity between information transmitted from a plurality of terminal apparatuses, a content item management unit managing a content item registered on the community site by each terminal apparatus, and a terminal data acquisition unit acquiring terminal data transmitted from each terminal apparatus and used to specify each terminal apparatus, the information processing method includes deleting both the community site and the content item on the community site based on the terminal data acquired by the terminal data acquisition unit or the content item managed by the content item management unit.

(7) A terminal apparatus includes: a communication unit communicating with a server managing a community site created in accordance with a similarity with information of another terminal apparatus and a content item registered in the community site; and a creation unit creating terminal data used to specify the terminal apparatus. The communication unit transmits the terminal data to the server deleting both the community site and the content item on the community site based on the transmitted terminal data or the content item on the community site.

(8) In the terminal apparatus according to (7), the terminal data indicates a position of the terminal apparatus.

(9) In the terminal apparatus according to (7) or (8), when the server receives an instruction to create an associated community site associated with the community site, the communication unit copies the community site and the content item on the community site, creates the associated community site and a content item on the associated community site, and transmits the terminal data to the server deleting the community site, which is a copy source, and the content item on the community site when the number of terminal data is greater than a predetermined number.

(10) In the terminal apparatus according to (9), after the associated community site is created in the server, the communication unit receives a request for disclosing the content item on the associated community site registered by the terminal apparatus from the server and transmits a response to the request to the server.

(11) An information processing system includes a plurality of terminal apparatuses; and an information processing apparatus creating a community site in accordance with a similarity between information transmitted from the plurality of terminal apparatuses. The terminal apparatus includes a creation unit creating terminal data used to specify each terminal apparatus and a communication unit transmitting the terminal data to the information processing apparatus. The information processing apparatus includes a community site management unit managing the community site created in accordance with a distance between the terminal apparatuses, a content item management unit managing a content item registered on the community site by each terminal apparatus, and a terminal data acquisition unit acquiring the terminal data transmitted from each terminal apparatus and used to specify each terminal apparatus. The community site management unit deletes both the community site and the content item on the community site based on the terminal data acquired by the terminal data acquisition unit or the content item managed by the content item management unit.

REFERENCE SIGNS LIST 2, 2-1, 2-2: portable terminal apparatus
3: ASNS server
21: network communication unit
22: position specifying unit
23: near-position wireless communication unit
31: network communication unit
32: terminal data acquisition unit
33: temporary community site management unit
34: content item management unit
35: content item determination unit
41: temporary community site management DB
42: content item DB
61: creation unit
62: reference unit
63: updating unit
64: deletion unit
81: creation unit
82: reference unit
83: updating unit
84: deletion unit

What is claimed is:

1. A server, comprising:
a communication interface configured to acquire, from each of a plurality of terminals, location information and image data from each terminal of the plurality of terminals; and
processing circuitry configured to:
create a community in which only terminals within a predetermined range of a geographic location corresponding to the community are permitted to access;
manage the community in accordance with management data to permit access to the community only by the terminals located within the predetermined range of the geographic location based at least in part on the location information from each terminal, of the plurality of terminals; and
provide image data, identified by at least one terminal of the plurality of terminals that is permitted to access the community, to each terminal device accessing the community, wherein
the communication interface is configured to acquire updated location information corresponding to the at least one terminal, and
the processing circuitry is configured to automatically delete only the image data identified by the at least one terminal from the community in a case that the processing circuitry determines, based on the updated location information, that the at least one terminal is outside of the predetermined range of the geographic location information.

2. The server of claim 1, wherein the processing circuitry is configured to delete the community when a number of terminals permitted to access the community is less than a predetermined threshold.

3. The server of claim 1, wherein
the management data is stored to at least one storage device, and
the processing circuitry is configured to delete the management data from the at least one storage device in response to determining that the community is to be deleted.

4. The server of claim 1, wherein the processing circuitry is configured to delete the community in response to a predetermined condition relating to usage of the community being satisfied.

5. The server of claim 1, wherein
the community is a first community, and
the processing circuitry is further configured to
receive an instruction to establish a second community associated with the first community; and
establish the second community if a number of the plurality of terminals that are permitted to access the first community and are present within the predetermined range of the geographic location corresponding to the community exceeds a predetermined threshold.

6. The server of claim 1, wherein the processing circuitry is configured to manage the community, to permit access to the community by the plurality of terminals based at least in part on the plurality of terminals identifying common or similar content within the predetermined range of the geographic location corresponding to the community.

7. The server of claim 6, wherein the common or similar content comprises user identification information.

8. The server of claim 6, wherein the common or similar content comprises photographs.

9. The server of claim 1, wherein the processing circuitry is configured to manage the community to permit access to the community by the plurality of terminal apparatuses based at least in part on the plurality of terminal apparatuses identifying common or similar content within a particular time frame.

10. The server of claim 9, wherein the common or similar content comprises user identification information.

11. The server of claim 9, wherein the common or similar content comprises photographs.

12. The server of claim 1, wherein the management data comprises the predetermined range that defines an area in which each of the plurality of terminals must be present to access the community.

13. A method performed by a server, the method comprising:
- acquiring, from each of a plurality of terminals, location information and image data from each terminal of the plurality of terminals;
- creating a community which only terminals within a predetermined range of a geographic location corresponding to the community are permitted to access;
- managing the community in accordance with management data to permit access to the community only by the terminals located within the predetermined range of the geographic location based at least in part on the location information from each terminal of the plurality of terminals;
- providing image data, identified by at least one terminal of the plurality of terminals that is permitted to access the community, to each terminal device accessing the community;
- acquiring updated location information corresponding to the at least one terminal; and
- automatically deleting only the image data identified by the at least one terminal from the community in a case that the server determines, based on the updated location information that the at least one terminal is outside of the predetermined range of the geographic location.

14. One or more non-transitory computer readable media including computer-program instructions, which when executed by a server, cause the server to:
- acquire, from each of a plurality of terminals, location information and image data from each terminal of the plurality of terminals;
- create a community which only terminals within a predetermined range of a geographic location corresponding to the community are permitted to access;
- manage the community in accordance with management data to permit access to the community only by the terminals located within the predetermined range of the geographic location based at least in part on the location information from each terminal of the plurality of terminals;
- provide image data, identified by at least one terminal of the plurality of terminals that is permitted to access the community, to each terminal device accessing the community;
- acquire updated location information corresponding to the at least one terminal; and
- automatically delete only the image data identified by the at least one terminal from the community in a case that the server determines, based on the updated location information, that the at least one terminal is outside of the predetermined range of the geographic location.

15. A server comprising:
processing circuitry configured to
- acquire, from a plurality of terminals, location information and image data from each terminal of the plurality of terminals;
- manage a community which only terminals within a predetermined range of a geographic location corresponding to the community are permitted to access;
- provide image data, identified by at least one terminal of the plurality of terminals that is permitted to access the community, to each terminal device accessing the community;
- acquire updated location information corresponding to the terminal; and
- automatically delete only the image data identified by the at least one terminal from the community in a case that the server determines, based on the updated location information, that the at least one terminal is outside of the predetermined range of the geographic location.

* * * * *